United States Patent
Sasaki

(10) Patent No.: US 9,461,308 B2
(45) Date of Patent: Oct. 4, 2016

(54) ELECTRODE FOR LITHIUM ION SECONDARY BATTERY, LITHIUM ION SECONDARY BATTERY, SLURRY COMPOSITION, AND METHOD FOR PRODUCING ELECTRODE FOR LITHIUM ION SECONDARY BATTERY

(71) Applicant: ZEON CORPORATION, Tokyo (JP)

(72) Inventor: Tomokazu Sasaki, Tokyo (JP)

(73) Assignee: ZEON CORPORATION, Tokyo (JP)

(*) Notice: Subject to any disclaimer, the term of this patent is extended or adjusted under 35 U.S.C. 154(b) by 132 days.

(21) Appl. No.: 14/361,525

(22) PCT Filed: Nov. 27, 2012

(86) PCT No.: PCT/JP2012/080543
§ 371 (c)(1),
(2) Date: May 29, 2014

(87) PCT Pub. No.: WO2013/080938
PCT Pub. Date: Jun. 6, 2013

(65) Prior Publication Data
US 2014/0342226 A1    Nov. 20, 2014

(30) Foreign Application Priority Data
Nov. 29, 2011   (JP) ................................ 2011-260455

(51) Int. Cl.
| | | |
|---|---|---|
| *H01M 4/62* | (2006.01) | |
| *H01M 10/0525* | (2010.01) | |
| *C08F 220/02* | (2006.01) | |
| *H01M 4/13* | (2010.01) | |
| *C08F 12/30* | (2006.01) | |
| *H01M 4/04* | (2006.01) | |
| *H01M 4/139* | (2010.01) | |

(52) U.S. Cl.
CPC ............ *H01M 4/622* (2013.01); *C08F 220/02* (2013.01); *H01M 4/13* (2013.01); *H01M 4/623* (2013.01); *C08F 12/30* (2013.01); *H01M 4/0404* (2013.01); *H01M 4/139* (2013.01); *H01M 10/0525* (2013.01); *H01M 2220/30* (2013.01); *Y02E 60/122* (2013.01); *Y02P 70/54* (2015.11)

(58) Field of Classification Search
CPC .. C08F 212/08; C08F 220/06; C08F 236/10; C08F 12/30; C08F 220/02; H01M 10/0525; H01M 2220/30; H01M 4/0404; H01M 4/13; H01M 4/139; H01M 4/622; H01M 4/623; Y02E 60/122
See application file for complete search history.

(56) References Cited

U.S. PATENT DOCUMENTS

| | | | | |
|---|---|---|---|---|
| 8,277,976 | B2 * | 10/2012 | Ryu ....................... | H01M 4/13 324/427 |
| 2006/0275661 | A1 * | 12/2006 | Kim ..................... | C08F 220/18 429/217 |
| 2012/0183848 | A1 * | 7/2012 | Kang .................... | H01M 4/622 429/211 |
| 2013/0119318 | A1 * | 5/2013 | Hanasaki .............. | H01M 4/622 252/500 |

FOREIGN PATENT DOCUMENTS

| | | | | |
|---|---|---|---|---|
| JP | 2002-42819 | A | | 2/2002 |
| JP | 2003-217573 | A | | 7/2003 |
| JP | 2003-308841 | A | | 10/2003 |
| JP | 2005-100661 | A | | 4/2005 |
| JP | 4438102 | B2 | | 3/2010 |
| JP | 2010-146870 | A | | 7/2010 |
| JP | 2010146870 | A | * | 7/2010 |
| KR | WO 2011105687 | A2 | * | 9/2011 ............ H01M 4/622 |

OTHER PUBLICATIONS

International Search Report issued in PCT/JP2012/080543 mailed Feb. 19, 2013.
Written Opinion of the International Searching Authority issued in PCT/JP2012/080543 mailed Feb. 19, 2013.

* cited by examiner

*Primary Examiner* — Carlos Barcena
(74) *Attorney, Agent, or Firm* — Birch, Stewart, Kolasch & Birch, LLP

(57) ABSTRACT

An electrode for a lithium ion secondary battery includes an electrode active material and a water-soluble polymer. The water-soluble polymer is a copolymer containing 1% by weight to 30% by weight of an aromatic vinyl monomer unit, 20% by weight to 60% by weight of an unsaturated carboxylic acid monomer unit, and 0.1% by weight to 5% by weight of a crosslinkable monomer unit.

9 Claims, No Drawings

ELECTRODE FOR LITHIUM ION SECONDARY BATTERY, LITHIUM ION SECONDARY BATTERY, SLURRY COMPOSITION, AND METHOD FOR PRODUCING ELECTRODE FOR LITHIUM ION SECONDARY BATTERY

FIELD

The present invention relates to an electrode for a lithium ion secondary battery, a lithium ion secondary battery, and a slurry composition, and a method for producing an electrode for a lithium ion secondary battery.

BACKGROUND

In recent years, handheld terminal devices such as notebook-sized personal computers, cellular phones, and PDA (Personal Digital Assistant) are remarkably widespread. As a secondary battery used as a power source for these handheld terminal devices, e.g., a nickel-metal hydride secondary battery and a lithium ion secondary battery are often used. The handheld terminal devices are required to have a comfortable portability, and therefore such devices are rapidly becoming smaller, thinner and lighter with better performance. As a result, the handheld terminal devices are now being used in a wide variety of situations. Like the demand on the handheld terminal devices, there also is a demand on the secondary battery to be smaller, thinner and lighter with better performance.

For improving the performance of the secondary battery, there have been made studies on modification of the electrode, the electrolytic solution, and other members of the battery. Among them, the electrode is usually produced by mixing an electrode active material and, if necessary, an electroconductive material such as electroconductive carbon with a liquid composition in which a polymer that serves as a binder (binding agent) is dispersed or dissolved in a solvent such as water and an organic solvent, to prepare a slurry composition, and applying the slurry composition onto a current collector, and then drying the slurry composition.

As the solvent, an organic solvent has often been used in prior art. However, use of the organic solvent causes problems such as cost required for recycling the organic solvent, and necessity for ensuring safety in using the organic solvent. Therefore, in recent years, production of an electrode using water as the solvent has been studied (see Patent Literatures 1 to 6).

CITATION LIST

Patent Literature

Patent Literature 1: Japanese Patent No. 4438102 B
Patent Literature 2: Japanese Patent Application Laid-Open No. 2003-308841 A
Patent Literature 3: Japanese Patent Application Laid-Open No. 2003-217573 A
Patent Literature 4: Japanese Patent Application Laid-Open No. 2010-146870 A
Patent Literature 5: Japanese Patent Application Laid-Open No. 2002-042819 A
Patent Literature 6: Japanese Patent Application Laid-Open No. 2005-100661 A

SUMMARY

Technical Problem

However, a prior-art electrode produced using water as the solvent has a problem in adhesion of an active electrode material to a current collector. Low adhesion results in failure in retaining the electrode active material on the current collector, and may cause a decrease in battery performance. In particular, low adhesion may cause a decrease in storage property and cycle property in a high temperature environment. Therefore, there is a demand for a technique of improving the adhesion of the electrode active material to the current collector.

The present invention has been made in view of the aforementioned problems. It is an object of the present invention to provide a lithium ion secondary battery that has excellent adhesion of an electrode active material to a current collector, and excellent storage property and cycle property in a high temperature environment; an electrode for a lithium ion secondary battery that enables such a lithium ion secondary battery; a slurry composition that enables production of such an electrode for a lithium ion secondary battery; and a method for producing the electrode for the lithium ion secondary battery.

Solution to Problem

The present inventor has carried out extensive studies for solving the problems. As a result, the inventor has found out that an electrode for a lithium ion secondary battery produced using an electrode active material and a water-soluble polymer containing an aromatic vinyl monomer unit, an unsaturated carboxylic acid monomer unit, and a crosslinkable monomer unit at a certain ratio can improve the adhesion of the electrode active material to a current collector, to thereby realize a lithium ion secondary battery that has excellent storage property and cycle property in a high temperature environment. Thus, the present invention has been completed.

That is, the present invention is as follows.

(1) An electrode for a lithium ion secondary battery, comprising an electrode active material and a water-soluble polymer, wherein
the water-soluble polymer is a copolymer containing 1% by weight to 30% by weight of an aromatic vinyl monomer unit, 20% by weight to 60% by weight of an unsaturated carboxylic acid monomer unit, and 0.1% by weight to 5% by weight of a crosslinkable monomer unit.

(2) The electrode for a lithium ion secondary battery according to (1), wherein the aromatic vinyl monomer unit is a styrene monomer unit or a sodium styrenesulfonate monomer unit.

(3) The electrode for a lithium ion secondary battery according to (1) or (2), wherein the unsaturated carboxylic acid monomer unit is an unsaturated monocarboxylic acid monomer unit.

(4) The electrode for a lithium ion secondary battery according to any one of (1) to (3), wherein
the water-soluble polymer further contains a fluorine-containing (meth)acrylic acid ester monomer unit, and
a ratio of the fluorine-containing (meth)acrylic acid ester monomer unit is 1% by weight to 30% by weight.

(5) The electrode for a lithium ion secondary battery according to any one of (1) to (4), wherein a content of the water-soluble polymer is 0.1 parts by weight to 30 parts by weight relative to 100 parts by weight of the electrode active material.

(6) The electrode for a lithium ion secondary battery according to any one of (1) to (5), further comprising a particulate binder.

(7) A lithium ion secondary battery comprising a positive electrode, a negative electrode, an electrolytic solution, and a separator, wherein at least one of the positive electrode and the negative electrode is the electrode for a lithium ion secondary battery according to any one of (1) to (6).

(8) A slurry composition for producing an electrode for a lithium ion secondary battery, comprising an electrode active material and a water-soluble polymer, wherein the water-soluble polymer is a copolymer containing 1% by weight to 30% by weight of an aromatic vinyl monomer unit, 20% by weight to 60% by weight of an unsaturated carboxylic acid monomer unit, and 0.1% by weight to 5% by weight of a crosslinkable monomer unit.

(9) A method for producing an electrode for a lithium ion secondary battery, comprising applying the slurry composition according to (8) onto a current collector, and drying the slurry composition.

Advantageous Effects of Invention

The electrode for a lithium ion secondary battery of the present invention can improve the adhesion of an electrode active material to a current collector, and realizes a lithium ion secondary battery that has excellent storage property and cycle property in a high temperature environment.

The lithium ion secondary battery of the present invention has excellent storage property and cycle property in a high temperature environment.

With the slurry composition of the present invention, an electrode for a lithium ion secondary battery that has excellent adhesion of an electrode active material to a current collector can be produced, to thereby realize a lithium ion secondary battery that has excellent storage property and cycle property in a high temperature environment.

According to the method for producing an electrode for a lithium ion secondary battery of the present invention, the lithium ion secondary battery of the present invention can be produced.

DESCRIPTION OF EMBODIMENTS

The present invention will be described hereinbelow in detail with reference to embodiments and examples. However, the present invention is not limited to these embodiments and examples. The present invention may be optionally modified without departing from the scope of claims of the present invention and its equivalents.

In the present description, "(meth)acryl-" means "acryl-" or "methacryl-". Further, "(meth)acrylate" means "acrylate" or "methacrylate". A "positive electrode active material" means an electrode active material for a positive electrode, and a "negative electrode active material" means an electrode active material for a negative electrode. Further, a "positive electrode active material layer" means an electrode active material layer provided in a positive electrode, and a "negative electrode active material layer" means an electrode active material layer provided in a negative electrode.

That a compound (including a polymer) is water-soluble means that when 0.5 g of the compound is dissolved in 100 g of water at 25° C., the insoluble content is less than 0.5% by weight. On the other hand, that a compound is water-insoluble means that when 0.5 g of the compound is dissolved in 100 g of water at 25° C., the insoluble content is 90% by weight or more.

[1. Electrode for Lithium Ion Secondary Battery]

The electrode for a lithium ion secondary battery of the present invention contains an electrode active material and a water-soluble polymer. The electrode for a lithium ion secondary battery of the present invention usually has a current collector and an electrode active material layer provided on the current collector, and the electrode active material layer contains the electrode active material and the water-soluble polymer.

[1.1. Electrode Active Material]

Examples of the electrode active material may include a positive electrode active material and a negative electrode active material.

The positive electrode active material is an electrode active material used in a positive electrode, and is a substance that donates or accepts an electron in a positive electrode of a lithium ion secondary battery. As the positive electrode active material, a substance capable of intercalating and deintercalating a lithium ion is usually used. Such positive electrode active materials are classified into a material composed of an inorganic compound and a material composed of an organic compound.

Examples of the positive electrode active material composed of an inorganic compound may include transition metal oxides, transition metal sulfides, and lithium-containing complex metal oxides of lithium and transition metal. Examples of the transition metal may include Ti, V, Cr, Mn, Fe, Co, Ni, Cu, and Mo.

Examples of the transition metal oxides may include MnO, $MnO_2$, $V_2O_5$, $V_6O_{13}$, $TiO_2$, $Cu_2V_2O_3$, amorphous $V_2O$—$P_2O_5$, and $MoO_3$. Among them, MnO, $V_2O_5$, $V_6O_{13}$, and $TiO_2$ are preferable in terms of cycle stability and capacity.

Examples of the transition metal sulfides may include $TiS_2$, $TiS_3$, amorphous $MoS_2$, and FeS.

Examples of the lithium-containing complex metal oxides may include a lithium-containing complex metal oxide having a layered structure, a lithium-containing complex metal oxide having a spinel structure, and a lithium-containing complex metal oxide having an olivine-type structure.

Examples of the lithium-containing complex metal oxides having a layered structure may include a lithium-containing cobalt oxide ($LiCoO_2$), a lithium-containing nickel oxide ($LiNiO_2$), a Co—Ni—Mn lithium complex oxide, a Ni—Mn—Al lithium complex oxide, and a Ni—Co—Al lithium complex oxide.

Examples of the lithium-containing complex metal oxide having a spinel structure may include lithium manganate ($LiMn_2O_4$) and $Li[Mn_{3/2}M_{1/2}]O_4$ in which part of Mn in lithium manganate is substituted with other transition metals (wherein M represents Cr, Fe, Co, Ni, or Cu).

Examples of the lithium-containing complex metal oxides having an olivine-type structure may include an olivine-type lithium phosphate compound represented by $Li_xMPO_4$ (wherein M represents at least one selected from the group consisting of Mn, Fe, Co, Ni, Cu, Mg, Zn, V, Ca, Sr, Ba, Ti, Al, Si, B, and Mo, and X represents a number satisfying $0 \leq X \leq 2$).

Examples of the positive electrode active material composed of an organic compound may include electroconductive polymer compounds such as polyacetylene and poly-p-phenylene.

Further, a positive electrode active material composed of a composite material that is a combination of an inorganic compound and an organic compound may also be used. For example, an iron-containing oxide may be subjected to reduction-firing in the presence of a carbon source material to produce a composite material coated with a carbon material, and this composite material may be used as the positive electrode active material. An iron-containing oxide tends to have poor electroconductivity. However, it may be used as a high performance positive electrode active material by forming such a composite material.

Further, those obtained by partial element substitution of the aforementioned compound may also be used as a positive electrode active material.

A mixture of the inorganic compound and the organic compound may also be used as the positive electrode active material.

As the positive electrode active material, one species thereof may be solely used, or two or more species thereof may be used in combination at any ratio.

The volume average particle diameter of particles of the positive electrode active material is preferably 1 μm or larger, and more preferably 2 μm or larger, and preferably 50 μm or smaller, and more preferably 30 μm or smaller. When the volume average particle diameter of particles of the positive active material is set to be within the aforementioned range, the amounts of a water-soluble polymer and a particulate binder for preparing the positive electrode active material layer can be reduced, and a decrease in the capacity of the lithium ion secondary battery can be suppressed. For forming a positive electrode active material layer, a slurry composition containing a positive electrode active material and a water-soluble polymer may be prepared. At this time, when the volume average particle diameter of particles of the positive electrode active material is set to be within the aforementioned range, the viscosity of the slurry composition can be easily adjusted to a proper viscosity that facilitates application, whereby a positive electrode can be obtained with uniform application of the slurry composition. The volume average particle diameter may be measured using a laser diffraction particle size distribution measurement device.

The negative electrode active material is an electrode active material used in a negative electrode, and is a substance that donates or accepts an electron in a negative electrode of a lithium ion secondary battery. As the negative electrode active material, a substance capable of storing and releasing lithium is usually used. Examples of such a substance capable of storing and releasing lithium may include a metal active material, a carbon active material, and an active material combining these materials.

The metal active material is an active material containing metal, and is usually an active material that contains in its structure an element capable of being intercalated (namely, doped) with lithium and has a theoretical electronic capacitance per unit weight of 500 mAh/g or more when the material is intercalated with lithium. The upper limit of the theoretical electronic capacitance is not particularly limited, and may be, e.g., 5,000 mAh/g or less. Examples of the metal active material for use may include: lithium metal, elemental metal capable of forming a lithium alloy, an alloy thereof, and an oxide, a sulfide, a nitride, a silicide, a carbide, and a phosphide thereof.

Examples of the elemental metal capable of forming a lithium alloy may include elemental metals such as Ag, Al, Ba, Bi, Cu, Ga, Ge, In, Ni, P, Pb, Sb, Si, Sn, Sr, Zn, and Ti.

Examples of an alloy of the elemental metal capable of forming a lithium alloy may include compounds containing the elemental metals. Among them, silicon (Si), tin (Sn), lead (Pb), and titanium (Ti) are preferable, and silicon, tin, and titanium are more preferable. Therefore, elemental metal of silicon (Si), tin (Sn), or titanium (Ti), an alloy containing these elemental metals, or a compound containing these metals are preferable.

The metal active material may further contain one or more non-metallic elements. Examples thereof may include SiC, $SiO_xC_y$ ($0<x\leq3$, $0<y\leq5$), $Si_3N_4$, $Si_2N_2O$, $SiO_x$ ($0<x\leq2$), $SnO_x$ ($0<x\leq2$), LiSiO, and LiSnO. Among them, $SiO_xC_y$, which is capable of being intercalated and deintercalated (namely, dedoped) with lithium at low potential is preferable. $SiO_xC_y$ may be obtained by, e.g., calcination of a polymer material containing silicon. Particularly, $SiO_xC_y$ wherein $0.8\leq x\leq3$ and $2\leq y\leq4$ is preferably used in view of the balance between capacity and cycle property.

Examples of the oxide, the sulfide, the nitride, the silicide, the carbide and the phosphide of lithium metal, elemental metal capable of forming a lithium alloy and an alloy thereof may include an oxide, a sulfide, a nitride, a silicide, a carbide, and a phosphide of the element capable of intercalating lithium. Among them, the oxide is particularly preferable. For example, a lithium-containing metal complex oxide containing an oxide such as tin oxide, manganese oxide, titanium oxide, niobium oxide, and vanadium oxide, and a metal element selected from the group consisting of Si, Sn, Pb, and Ti atoms is used.

Further examples of the lithium-containing metal complex oxide may include a lithium-titanium complex oxide represented by $Li_xTi_yM_zO_4$ (wherein $0.7\leq x\leq1.5$, $1.5\leq y\leq2.3$, and $0\leq z\leq1.6$, and M represents an element selected from the group consisting of Na, K, Co, Al, Fe, Ti, Mg, Cr, Ga, Cu, Zn, and Nb), and a lithium-manganese complex oxide represented by $Li_xMn_yM_zO_4$ (wherein x, y, z, and M are the same as defined in the lithium-titanium complex oxide). Among them, $Li_{4/3}Ti_{5/3}O_4$, $Li_1Ti_2O_4$, $Li_{4/5}Ti_{11/5}O_4$, and $Li_{4/3}Mn_{5/3}O_4$ are preferable.

Among these metal active materials, an active material containing silicon is preferable. Use of the active material containing silicon can increase electric capacity of the lithium ion secondary battery. In general, the active material containing silicon greatly expands and shrinks during charging and discharging (by a factor of, e.g., about 5). However, in the electrode for a lithium ion secondary battery of the present invention, a decrease in battery performance due to the expansion or shrinkage of the active material containing silicon can be prevented by the water-soluble polymer according to the present invention.

Among the active materials containing silicon, $SiO_x$, SiC, and $SiO_xC_y$ are preferable. In an active material containing a combination of Si and C among them, it is assumed that intercalation and deintercalation of Li into and from Si (silicon) occur at a high electric potential, and intercalation and deintercalation of Li into and from C (carbon) occur at a low electric potential at low potential. Therefore, expansion and shrinkage are suppressed as compared with those in other metal active materials. Accordingly, the charging/discharging cycle property of the lithium ion secondary battery can be improved.

The carbon active material is an active material having a carbon main skeleton that is capable of being intercalated with lithium, and examples thereof may include carbonaceous materials and graphite materials.

The carbonaceous material is generally a carbon material having a low degree of graphitization (i.e., having low crystallinity) that is formed by heat treatment of a carbon precursor at 2,000° C. or lower for carbonization. The lower limit of the heat treatment is not particularly limited, and may be, e.g., 500° C. or higher.

Examples of the carbonaceous material may include graphitizable carbon of which a carbon structure easily varies depending on the heat treatment temperature and non-graphitizable carbon having a structure close to an amorphous structure that is typified by glassy carbon.

Examples of the graphitizable carbon may include a carbon material that is produced using as a raw material tar pitch obtained from petroleum or coal. Specific examples thereof may include cokes, meso-carbon microbeads (MC-MBs), mesophase pitch carbon fibers, and pyrolytic vapor-phase growth carbon fibers. MCMBs are carbon fine particles obtained by separating and extracting mesophase spherules that is produced in a process of heating pitches at about 400° C. The mesophase pitch carbon fibers are carbon fibers produced using as a raw material mesophase pitch that has been obtained by growth and coalescence of the mesophase spherules. The pyrolytic vapor-phase growth carbon fibers are carbon fibers obtained by (1) a method of thermally decomposing acrylic polymer fibers, (2) a method of spinning and then thermally decomposing pitches, or (3) a catalytic vapor-phase growth (catalytic CVD) method in which hydrocarbon is thermally decomposed in a vapor phase using as a catalyst nanoparticles of, e.g., iron.

Examples of the non-graphitizable carbon may include a calcined product of phenolic resin, polyacrylonitrile carbon fibers, quasi-isotropic carbon, a calcined product of furfuryl alcohol resin (PFA), and hard carbon.

The graphite material is a material that is obtained by heat treatment of graphitizable carbon at 2,000° C. or higher and has a high crystallinity that is close to the crystallinity of graphite. The upper limit of the heat treatment temperature is not particularly limited, and may be, e.g., 5,000° C. or lower.

Examples of the graphite material may include natural graphite and artificial graphite. Typical examples of the artificial graphite may include artificial graphite obtained by heat treatment at 2,800° C. or higher, graphitized MCMBs obtained by heat treatment of MCMBs at 2,000° C. or higher, and graphitized mesophase pitch carbon fibers obtained by heat treatment of mesophase pitch carbon fibers at 2,000° C. or higher.

Among the carbon active materials, the carbonaceous materials are preferable. When the carbonaceous material is used, resistance of the lithium ion secondary battery can be reduced, and a lithium ion secondary battery having excellent input/output property can be produced.

As the negative electrode active material, one species thereof may be solely used, or two or more species thereof may be used in combination at any ratio.

It is preferable that the negative electrode active material is in a form of granular particles. When the particles have a spherical shape, an electrode having a higher density can be formed during formation of the electrode.

When the negative electrode active material is in a form of particles, the volume average particle diameter of the particles is appropriately set in view of the balance between other components of the lithium ion secondary battery, and is usually 0.1 µm or larger, preferably 1 µm or larger, and more preferably 5 µm or larger, and usually 100 µm or smaller, preferably 50 µm or smaller, and more preferably 20 µm or smaller.

From the viewpoints of improvement of battery properties such as initial efficiency, load property, and cycle property, the 50% volume cumulative particle diameter of particles of the negative electrode active material is usually 1 µm or larger, and preferably 15 µm or larger, and usually 50 µm or smaller, and preferably 30 µm or smaller. The 50% volume cumulative particle diameter may be calculated as a particle diameter at which the cumulative volume calculated in a particle diameter distribution measured by a laser diffraction method from a small particle diameter side is 50%.

The tap density of the negative electrode active material is not particularly limited. A material having a tap density of 0.6 g/cm$^3$ or more is suitably used.

From the viewpoint of improvement of power density, the specific surface area of the negative electrode active material is usually 2 m$^2$/g or larger, preferably 3 m$^2$/g or larger, and more preferably 5 m$^2$/g or larger, and usually 20 m$^2$/g or smaller, preferably 15 m$^2$/g or smaller, and more preferably 10 m$^2$/g or smaller. The specific surface area of the negative electrode active material may be measured by, e.g., a BET method.

[1.2. Water-Soluble Polymer]

The water-soluble polymer is a copolymer containing an aromatic vinyl monomer unit, an unsaturated carboxylic acid monomer unit, and a crosslinkable monomer unit at a specific ratio. Since the water-soluble polymer contains the aromatic vinyl monomer unit, the unsaturated carboxylic acid monomer unit, and the crosslinkable monomer unit in combination at a specific ratio, the electrode for a lithium ion secondary battery of the present invention has excellent adhesion of an active electrode material to a current collector. Further, the water-soluble polymer may contain a fluorine-containing (meth)acrylic acid ester monomer unit.

In the electrode for a lithium ion secondary battery, the water-soluble polymer is usually interposed between the electrode active materials and between the electrode active material and the current collector, and may exert an action of binding the electrode active material and the current collector. In a slurry composition for producing an electrode for a lithium ion secondary battery, the water-soluble polymer may usually exert an action of uniformly dispersing the electrode active material and an optionally used particulate binder, and an action of adjusting the viscosity of the slurry composition.

Aromatic Vinyl Monomer Unit

The aromatic vinyl monomer unit is a structural unit obtained by polymerization of an aromatic vinyl monomer. Examples of the aromatic vinyl monomer may include styrene, α-methylstyrene, vinyl toluene, divinylbenzene, and sodium p-styrenesulfonate. Among them, styrene and sodium p-styrenesulfonate are preferable. Therefore, it is preferable that the aromatic vinyl monomer unit is a styrene monomer unit or a sodium styrenesulfonate monomer unit.

As the aromatic vinyl monomer and the aromatic vinyl monomer unit, one species thereof may be solely used, or two or more species thereof may be used in combination at any ratio.

The ratio of the aromatic vinyl monomer unit in the water-soluble polymer is preferably 1% by weight or more, more preferably 2% by weight or more, and particularly preferably 5% by weight or more, and preferably 30% by weight or less, more preferably 25% by weight or less, and particularly preferably 20% by weight or less.

When the ratio of the aromatic vinyl monomer unit is set to be equal to or more than the lower limit of the aforementioned range, the absorptive property of the water-soluble polymer to the electrode active material can be increased. Therefore, the adhesion between the electrode active materials and the adhesion of the electrode active material to the current collector can be increased, and the electrode active material can be stably retained on an electrode active material layer. In the electrode for a lithium ion secondary battery, the water-soluble polymer can form a coating layer on the surface of the electrode active material. Since the water-soluble polymer has high absorptive property to the electrode active material, the electrode active material can be stably covered with the coating layer. Therefore, decomposition of an electrolytic solution can be suppressed to thereby improve the high-temperature storage property and high-temperature cycle property of the lithium ion secondary battery. The improvement of the absorptive property of the aromatic vinyl monomer unit to the electrode active material is attributed to high hydrophobicity of the aromatic vinyl monomer unit which enables adsorption on a hydrophobic portion of the electrode active material with high affinity.

On the other hand, when the ratio of the aromatic vinyl monomer unit is set to be equal to or less than the upper limit of the aforementioned range, an excessive increase in the hydrophobicity of the water-soluble polymer can be suppressed, and the water-soluble polymer can thereby exhibit water solubility.

The ratio of the aromatic vinyl monomer unit in the water-soluble polymer may be adjusted by a ratio of the aromatic vinyl monomer relative to the total of the monomers used in the polymerization of the water-soluble polymer (addition ratio). The ratio of the monomer unit is usually the same as the ratio of the monomer (addition ratio).

Unsaturated Carboxylic Acid Monomer Unit

The unsaturated carboxylic acid monomer unit is a structural unit obtained by polymerization of an unsaturated carboxylic acid monomer. The unsaturated carboxylic acid monomer is a monomer having a carbon-carbon unsaturated bond and a carboxyl group. The number of the carboxyl group in the unsaturated carboxylic acid monomer may be one, and may also be two or more.

Examples of the unsaturated carboxylic acid monomer may include unsaturated monocarboxylic acids and derivatives thereof, unsaturated dicarboxylic acids and acid anhydrides thereof, and derivatives thereof.

Examples of the unsaturated monocarboxylic acid may include ethylenically unsaturated monocarboxylic acids such as acrylic acid, methacrylic acid, and crotonic acid.

Examples of the unsaturated monocarboxylic acid derivative may include derivatives of ethylenically unsaturated monocarboxylic acids such as 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of the unsaturated dicarboxylic acid may include ethylenically unsaturated dicarboxylic acids such as maleic acid, fumaric acid, and itaconic acid.

Examples of the acid anhydride of unsaturated dicarboxylic acid may include acid anhydrides of ethylenically unsaturated dicarboxylic acid such as maleic anhydride, acrylic anhydride, methylmaleic anhydride, and dimethylmaleic anhydride.

Examples of the unsaturated dicarboxylic acid derivative may include methylallyl maleate such as methylmaleic acid, dimethylmaleic acid, phenylmaleic acid, chloromaleic acid, dichloromaleic acid, and fluoromaleic acid; and maleic acid esters such as diphenyl maleate, nonyl maleate, decyl maleate, dodecyl maleate, octadecyl maleate, and fluoroalkyl maleate.

Among them, unsaturated monocarboxylic acid such as acrylic acid and methacrylic acid is preferable since therewith the dispersibility of the water-soluble polymer in water can be enhanced. Therefore, it is preferable that the unsaturated carboxylic acid monomer unit is an unsaturated monocarboxylic acid monomer unit.

As the unsaturated carboxylic acid monomer and the unsaturated carboxylic acid monomer unit, one species thereof may be solely used, or two or more species thereof may be used in combination at any ratio.

The ratio of the unsaturated carboxylic acid monomer unit in the water-soluble polymer is preferably 20% by weight or more, more preferably 25% by weight or more, and particularly preferably 30% by weight or more, and preferably 60% by weight or less, more preferably 55% by weight or less, and particularly preferably 50% by weight or less.

When the ratio of the unsaturated carboxylic acid monomer unit in the water-soluble polymer is set to be equal to or more than the lower limit of the aforementioned range, the hydrophilicity of the water-soluble polymer can be increased, whereby the water-soluble polymer can be made water-soluble. Further, in the slurry composition for producing an electrode for a lithium ion secondary battery, unevenness and aggregation of the electrode active material and the particulate binder can be suppressed by electrostatic repulsion effect of the water-soluble polymer with the electrode active material and the particulate binder, and the dispersion stability of the slurry composition can be improved. Therefore, the distribution of the electrode active material and the particulate binder in the electrode active material layer can be made uniform to improve the adhesion. Since the hydrophilicity of the water-soluble polymer can be increased as described above, the affinity of the water-soluble polymer to a member having a hydrophilic group such as a current collector can be improved. Such increase in affinity also contributes to improvement of the adhesion.

On the other hand, when the ratio of the unsaturated carboxylic acid monomer unit in the water-soluble polymer is set to be equal to or less than the upper limit of the aforementioned range, excessive contact between the carboxyl group of the water-soluble polymer and the electrolytic solution in the lithium ion secondary battery can be prevented, and the durability of the lithium ion secondary battery can thereby be improved.

The ratio of the unsaturated carboxylic acid monomer unit in the water-soluble polymer may be adjusted by the ratio of the unsaturated carboxylic acid monomer relative to the total of the monomers used in the polymerization of the water-soluble polymer (addition ratio). The ratio of the monomer unit is usually the same as the ratio of the monomer (addition ratio).

Crosslinkable Monomer Unit

The crosslinkable monomer unit is a structural unit obtained by polymerization of a crosslinkable monomer. The crosslinkable monomer is a monomer that is capable of forming a crosslinking structure during or after polymerization by heat or energy irradiation. Examples of the crosslinkable monomer may usually include a monomer having thermal crosslinkability. Specific examples thereof may include monofunctional crosslinkable monomers having a thermally crosslinkable group and one olefinic double bond per molecule; and polyfunctional crosslinkable monomers having two or more olefinic double bonds per molecule.

Examples of the thermally crosslinkable group may include an epoxy group, an N-methylolamide group, an oxetanyl group, an oxazoline group, and a combination thereof. Among them, an epoxy group is more preferable for facilitating adjustment of crosslinking and crosslink density.

Examples of the crosslinkable monomer having an epoxy group as the thermally crosslinkable group and an olefinic double bond may include unsaturated glycidyl ethers such as vinyl glycidyl ether, allyl glycidyl ether, butenyl glycidyl ether, and o-allylphenyl glycidyl ether; monoepoxides of diene or polyene such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of an unsaturated carboxylic acid such as glycidyl acrylate, glycidyl methacrylate, glycidyl crotonate, glycidyl 4-heptanoate, glycidyl sorbate, glycidyl linoleate, glycidyl 4-methyl-3-pentenoate, a glycidyl ester of 3-cyclohexenecarboxylic acid, and a glycidyl ester of 4-methyl-3-cyclohexenecarboxylic acid.

Examples of the crosslinkable monomer having an N-methylolamide group as the thermally crosslinkable group and an olefinic double bond may include (meth) acrylamides having a methylol group such as N-methylol (meth)acrylamide.

Examples of the crosslinkable monomer having an oxetanyl group as the thermally crosslinkable group and an olefinic double bond may include 3-((meth)acryloyloxymethyl)oxetane, 3-((meth)acryloyloxymethyl)-2-trifluoromethyl oxetane, 3-((meth)acryloyloxymethyl)-2-phenyl oxetane, 2-((meth)acryloyloxymethyl)oxetane, and 2-((meth) acryloyloxymethyl)-4-trifluoromethyl oxetane.

Examples of the crosslinkable monomer having an oxazoline group as the thermally crosslinkable group and an olefinic double bond may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of the crosslinkable monomer having two or more olefinic double bonds per molecule may include allyl (meth)acrylate, ethylene di(meth)acrylate, diethylene glycol di(meth)acrylate, triethylene glycol di(meth)acrylate, tetraethylene glycol di(meth)acrylate, trimethylolpropane tri (meth)acrylate, dipropylene glycol diallyl ether, polyglycol diallyl ether, triethylene glycol divinyl ether, hydroquinone diallyl ether, tetraallyloxyethane, trimethylolpropane diallyl ether, other allyl or vinyl ethers of polyfunctional alcohol, triallylamine, methylenebisacrylamide, and divinylbenzene.

Among these examples, ethylene dimethacrylate, allyl glycidyl ether, and glycidyl methacrylate are particularly preferable as the crosslinkable monomer.

As the crosslinkable monomer and the crosslinkable monomer unit, one species thereof may be solely used, or two or more species thereof may be used in combination at any ratio.

The ratio of the crosslinkable monomer unit in the water-soluble polymer is preferably 0.1% by weight or more, more preferably 0.2% by weight or more, and particularly preferably 0.5% by weight or more, and preferably 5% by weight or less, more preferably 4% by weight or less, and particularly preferably 3% by weight or less.

When the ratio of the crosslinkable monomer unit in the water-soluble polymer is set to be equal to or more than the lower limit of the aforementioned range, swelling of the water-soluble polymer by the electrolytic solution can be suppressed, and expansion of the electrode for a lithium ion secondary battery can be suppressed. An electrode active material containing Si generally tends to expand or shrink largely by charging and discharging. Therefore, the effect of suppressing the expansion of the electrode for a lithium ion secondary battery is particularly remarkable when the electrode active material containing Si is used. When the ratio of the crosslinkable monomer unit in the water-soluble polymer is set to be equal to or more than the lower limit of the aforementioned range, the rigidity of a main chain of the water-soluble polymer can be enhanced. Therefore, when the crosslinkable monomer unit and the unsaturated carboxylic acid monomer unit that can exert an effect of increasing the adhesion as described above are combined at a predetermined ratio, appropriate rigidity can be given to the water-soluble polymer, and the electrode active material can be tightly held by the water-soluble polymer. This prevents the electrode active material from being detached off the electrode, and therefore the high-temperature storage property and the high-temperature cycle property can be improved.

On the other hand, when the ratio of the crosslinkable monomer unit in the water-soluble polymer is set to be equal to or less than the upper limit of the aforementioned range, the solubility of the water-soluble polymer in water can be increased, and the dispersibility can be improved.

The ratio of the crosslinkable monomer unit in the water-soluble polymer may usually be adjusted by the ratio of the crosslinkable monomer relative to the total of the monomers used in the polymerization of the water-soluble polymer (addition ratio). The ratio of the monomer unit is usually the same as the ratio of the monomer (addition ratio).

Fluorine-Containing (Meth)Acrylic Acid Ester Monomer Unit

The fluorine-containing (meth)acrylic acid ester monomer unit is a structural unit obtained by polymerization of a fluorine-containing (meth)acrylic acid ester monomer. Examples of the fluorine-containing (meth)acrylic acid ester monomer may include a monomer represented by the following formula (I).

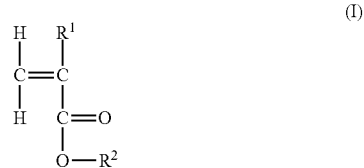

In the formula (I), $R^1$ represents a hydrogen atom or a methyl group.

In the formula (I), $R^2$ represents a hydrocarbon group containing a fluorine atom. The number of carbon in the hydrocarbon group is usually 1 or more and 18 or less. The number of fluorine atoms in $R^2$ may be one, and may also be two or more.

Examples of the fluorine-containing (meth)acrylic acid ester monomer represented by the formula (I) may include fluorinated alkyl(meth)acrylates, fluorinated aryl(meth) acrylates, and fluorinated aralkyl(meth)acrylates. Among them, fluorinated alkyl(meth)acrylate is preferable.

Specific examples of such a monomer may include perfluoroalkyl(meth)acrylates such as 2,2,2-trifluoroethyl (meth)acrylate, β-(perfluorooctyl)ethyl (meth)acrylate, 2,2, 3,3-tetrafluoropropyl(meth)acrylate, 2,2,3,4,4,4-hexafluorobutyl (meth)acrylate, 1H,1H,9H-perfluoro-1-nonyl(meth) acrylate, 1H,1H,11H-perfluoroundecyl(meth)acrylate, perfluorooctyl(meth)acrylate, and 3[4[1-trifluoromethyl-2, 2-bis[bis(trifluoromethyl)fluoromethyl]ethynyloxy]benzoxy]2-hydroxypropyl(meth)acrylate.

As the fluorine-containing (meth)acrylic acid ester monomer and the fluorine-containing (meth)acrylic acid ester monomer unit, one species thereof may be solely used, or two or more species thereof may be used in combination at any ratio.

The ratio of the fluorine-containing (meth)acrylic acid ester monomer unit in the water-soluble polymer is preferably 1% by weight or more, more preferably 2% by weight or more, and particularly preferably 5% by weight or more, and preferably 30% by weight or less, more preferably 25% by weight or less, and particularly preferably 20% by weight or less.

When the ratio of the fluorine-containing (meth)acrylic acid ester monomer unit in the water-soluble polymer is set to be equal to or more than the lower limit of the aforementioned range, a repulsive force against the electrolytic solution can be imparted to the water-soluble polymer, and the swelling degree can be set to an appropriate range.

On the other hand, when the ratio of the fluorine-containing (meth)acrylic acid ester monomer unit in the water-soluble polymer is set to be equal to or less than the upper limit of the aforementioned range, the wetting property of the water-soluble polymer against the electrolytic solution can be improved in cooperation with the hydrophilicity improvement effect of the unsaturated carboxylic acid monomer unit. This in turn elevates the ionic conductivity, and therefore improves the low-temperature output property of the resulting lithium ion secondary battery.

The ratio of the fluorine-containing (meth)acrylic acid ester monomer unit in the water-soluble polymer may be adjusted by the ratio of the fluorine-containing (meth)acrylic acid ester monomer relative to the total of the monomers used in the polymerization of the water-soluble polymer (addition ratio). The ratio of the monomer unit is usually the same as the ratio of the monomer (addition ratio).

In addition to the aromatic vinyl monomer unit, the unsaturated carboxylic acid monomer unit, the crosslinkable monomer unit, and the fluorine-containing (meth)acrylic acid ester monomer unit as described above, the water-soluble polymer may contain an optional structural unit as long as the effects of the present invention are not significantly impaired.

Examples of the optional structural unit may include a (meth)acrylic acid ester monomer unit other than the fluorine-containing (meth)acrylic acid ester monomer unit, an amide monomer unit, an olefin monomer unit, a halogen atom-containing monomer unit, a vinyl ester monomer unit, a vinyl ether monomer unit, a vinyl ketone monomer unit, and a heterocycle-containing vinyl compound monomer unit. Among them, a (meth)acrylic acid ester monomer unit is preferable.

The (meth)acrylic acid ester monomer unit is a structural unit obtained by polymerization of a (meth)acrylic acid ester monomer. However, among the (meth)acrylic acid ester monomers, those having fluorine is defined as the fluorine-containing (meth)acrylic acid ester monomer and distinguished from the (meth)acrylic acid ester monomer.

Examples of the (meth)acrylic acid ester monomer may include alkyl acrylates such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Among them, an alkyl acrylate is preferable, and ethyl acrylate, n-butyl acrylate, and 2-ethylhexyl acrylate are more preferable.

As the (meth)acrylic acid ester monomer and the (meth)acrylic acid ester monomer unit, one species thereof may be solely used, or two or more species thereof may be used in combination at any ratio.

In addition to the aforementioned optional structural unit, the water-soluble polymer may also contain, as other optional structural unit, a structural unit obtained by polymerization of a monomer having functionality such as a reactive surfactant monomer, and a structural unit obtained by polymerization of other copolymerizable monomers.

The reactive surfactant monomer is a monomer having a polymerizable group that is copolymerizable with another monomer and having a surface-active group (hydrophilic group and hydrophobic group). A reactive surfactant unit obtained by polymerization of the reactive surfactant monomer constitutes part of molecule of the water-soluble polymer and is a structural unit capable of acting as a surfactant.

The reactive surfactant monomer usually has a polymerizable unsaturated group, which also acts as a hydrophobic group after polymerization. Examples of the polymerizable unsaturated group in the reactive surfactant monomer may include a vinyl group, an allyl group, a vinylidene group, a propenyl group, an isopropenyl group, and an isobutylidene group. The number of types of such a polymerizable unsaturated group may be one, and may also be two or more.

The reactive surfactant monomer usually has a hydrophilic group as a moiety expressing hydrophilicity. The reactive surfactant monomer is classified into anionic, cationic, and nonionic surfactants depending on the type of the hydrophilic group.

Examples of the anionic hydrophilic group may include —$SO_3M$, —COOM, and —$PO(OH)_2$. M herein represents a hydrogen atom or a cation. Examples of the cation may include alkali metal ions such as lithium, sodium, and potassium; alkaline earth metal ions such as calcium and magnesium; ammonium ions; ammonium ions of alkylamine such as monomethylamine, dimethylamine, monoethylamine, and triethylamine; and ammonium ions of alkanolamine such as monoethanolamine, diethanolamine, and triethanolamine.

Examples of the cationic hydrophilic group may include —Cl, —Br, —I, and —$SO_3ORX$. RX herein represents an alkyl group. Examples of RX may include a methyl group, an ethyl group, a propyl group, and an isopropyl group.

Examples of the nonionic hydrophilic group may include —OH.

Suitable examples of the reactive surfactant monomer may include a compound represented by the following formula (II).

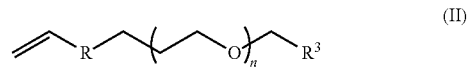

(II)

In the formula (II), R represents a divalent linking group. Examples of R may include an —Si—O— group, a methylene group, and a phenylene group. In the formula (II), $R^3$ represents a hydrophilic group. Examples of $R^3$ may include —$SO_3NH_4$. In the formula (II), n represents an integer of 1 or more and 100 or less.

Other suitable examples of the reactive surfactants may include a compound having a polymerization unit based on ethylene oxide and a polymerization unit based on butylene oxide, and also having at the terminals an alkenyl group having a terminal double bond and —SO$_3$NH$_4$ (for example, trade name "LATEMUL PD-104" available from Kao Corporation).

As the reactive surfactant monomer, one species thereof may be solely used, or two or more species thereof may be used in combination at any ratio.

When the water-soluble polymer contains the reactive surfactant unit, the ratio of the reactive surfactant unit is preferably 0.1% by weight or more, more preferably 0.2% by weight or more, and particularly preferably 0.5% by weight or more, and preferably 15% by weight or less, more preferably 10% by weight or less, and particularly preferably 5% by weight or less. When the ratio of the reactive surfactant unit in the water-soluble polymer is set to be equal to or more than the lower limit of the aforementioned range, the dispersibility of the slurry composition for producing an electrode for a lithium ion secondary battery can be improved. On the other hand, when the ratio of the reactive surfactant unit in the water-soluble polymer is set to be equal to or less than the upper limit of the aforementioned range, the durability of the electrode active material layer can be improved.

Additional examples of the optional structural unit of the water-soluble polymer may include a structural unit obtained by polymerization of the following monomers. Examples thereof may include units obtained by polymerization of one or more of the following: styrene-based monomers such as styrene, chlorostyrene, vinyl toluene, t-butylstyrene, vinylbenzoic acid, methyl vinylbenzoate, vinylnaphthalene, chloromethylstyrene, hydroxymethylstyrene, α-methylstyrene, and divinylbenzene; amide monomers such as acrylamide and acrylamide-2-methylpropanesulfonic acid; α,β-unsaturated nitrile compound monomers such as acrylonitrile and methacrylonitrile; olefin monomer such as ethylene and propylene; halogen atom-containing monomers such as vinyl chloride and vinylidene chloride; vinyl ester monomers such as vinyl acetate, vinyl propionate, vinyl butyrate, and vinyl benzoate; vinyl ether monomers such as methyl vinyl ether, ethyl vinyl ether, and butyl vinyl ether; vinyl ketone monomers such as methyl vinyl ketone, ethyl vinyl ketone, butyl vinyl ketone, hexyl vinyl ketone, and isopropenyl vinyl ketone; and heterocycle-containing vinyl compound monomers such as N-vinyl pyrrolidone, vinyl pyridine, and vinyl imidazole. The ratio of these structural units in the water-soluble polymer is preferably 0% by weight to 10% by weight, and more preferably 0% by weight to 5% by weight.

Additional examples of the optional structural unit of the water-soluble polymer may include a structural unit obtained by polymerization of a monomer containing a sulfonic acid group (—SO$_3$H) (this may be referred to hereinbelow as "sulfonic acid group-containing monomer unit") and a structural unit obtained by polymerization of a monomer containing a phosphoric acid group (—PO$_3$H$_2$) (this may be referred to hereinbelow as "phosphoric acid group-containing monomer unit").

Examples of the sulfonic acid group-containing monomer may include sulfonic acid group-containing monomers having only a sulfonic acid group as a functional group and salts thereof, monomers containing an amide group and a sulfonic acid group and salts thereof, and monomers containing a hydroxyl group and a sulfonic acid group and salts thereof. One species of these examples may be solely used, or two or more species thereof may be used in combination at any ratio. Therefore, the water-soluble polymer may contain solely one species of the sulfonic acid group-containing monomer unit, or two or more species thereof in combination at any ratio.

Examples of the sulfonic acid group-containing monomer having only a sulfonic acid group as a functional group may include monomers obtained by sulfonation of one of conjugated double bonds of a diene compound such as isoprene and butadiene, vinylsulfonic acid, styrenesulfonic acid, allylsulfonic acid, sulfoethyl methacrylate, sulfopropyl methacrylate, and sulfobutyl methacrylate. Examples of the salt thereof may include a lithium salt, a sodium salt, and a potassium salt. One species of these examples may be solely used, or two or more species thereof may be used in combination at any ratio.

Examples of the monomer containing an amide group and a sulfonic acid group may include 2-acrylamide-2-methylpropanesulfonic acid (AMPS). Examples of the salt thereof may include a lithium salt, a sodium salt, and a potassium salt. One species of these examples may be solely used, or two or more species thereof may be used in combination at any ratio.

Examples of the monomer containing a hydroxyl group and a sulfonic acid group may include 3-allyloxy-2-hydroxypropanesulfonic acid (HAPS). Examples of the salt thereof may include a lithium salt, a sodium salt, and a potassium salt. One species of these examples may be solely used, or two or more species thereof may be used in combination at any ratio.

Among them, it is preferable that the sulfonic acid group-containing monomer is styrenesulfonic acid, 2-acrylamide-2-methylpropanesulfonic acid (AMPS), a monomer containing an amide group and a sulfonic acid group, or a salt thereof.

The ratio of the sulfonic acid group-containing monomer unit in the water-soluble polymer is preferably 0.1% by weight or more, more preferably 0.2% by weight or more, and preferably 5% by weight or less, and more preferably 3% by weight or less. When the sulfonic acid group-containing monomer unit in the water-soluble polymer is contained in the water-soluble polymer within such a range, the dispersibility of the slurry composition for producing an electrode for a lithium ion secondary battery may be improved. When the electrode is produced, the sulfonic acid group may form a crosslinking structure in the electrode active material layer, whereby the strength of the electrode active material layer may be enhanced, and high-temperature storage property and low-temperature output property of the secondary battery may be improved.

Examples of the phosphoric acid group of the phosphoric acid group-containing monomer may include monomers having a —O—P(=O)(—OR$^4$)—OR$^5$ group (wherein R$^4$ and R$^5$ independently represent a hydrogen atom or any organic group), and salts thereof. Specific examples of organic groups represented by R$^4$ and R$^5$ may include aliphatic groups such as an octyl group and an aromatic group such as a phenyl group.

Examples of the phosphoric acid group-containing monomer may include compounds containing a phosphoric acid group and an allyloxy group, and a phosphoric acid group-containing (meth)acrylic acid ester. Examples of the compound containing a phosphoric acid group and an allyloxy group may include 3-allyloxy-2-hydroxypropanephosphoric acid. Examples of the phosphoric acid group-containing (meth)acrylic acid ester may include dioctyl-2-methacryloyloxyethyl phosphate, diphenyl-2-methacryloyloxyethyl phosphate, monomethyl-2-methacryloyloxyethyl phosphate, dimethyl-2-methacryloyloxyethyl phosphate, monoethyl-2-methacryloyloxyethyl phosphate, diethyl-2-methacryloyloxyethyl phosphate, monoisopropyl-2-methacryloyloxyethyl phosphate, diisopropyl-2-methacryloyloxyethyl phosphate, mono-n-butyl-2-methacryloyloxyethyl phosphate, di-n-butyl-2-methacryloyloxyethyl phosphate, monobutoxyethyl-2-methacryloyloxyethyl phosphate, dibutoxyethyl-2-methacryloyloxyethyl phosphate, mono(2-ethylhexyl)-2-methacryloyloxyethyl phosphate, and di(2-ethylhexyl)-2-methacryloyloxyethyl phosphate.

As the phosphoric acid group-containing monomer, one species thereof may be solely used, or two or more species thereof may be used in combination at any ratio. Therefore, the water-soluble polymer may contain solely one species of the phosphoric acid group-containing monomer unit, or two or more species thereof in combination at any ratio.

The ratio of the phosphoric acid group-containing monomer unit in the water-soluble polymer is preferably 0.1% by weight or more, more preferably 0.2% by weight or more, and preferably 10% by weight or less, and more preferably 5% by weight or less. When the phosphoric acid-containing monomer unit in the water-soluble polymer is contained within such a range, an effect based on the phosphoric acid group-containing monomer unit such as improvement in the adhesion between the current collector and the electrode active material layer may be obtained. Further, polymerization of the water-soluble polymer can be performed with an adequate polymerization degree, whereby undesired effects such as a decrease in durability may be prevented.

The weight average molecular weight of the water-soluble polymer is usually smaller than that of a polymer that becomes a particulate binder as described later, and is preferably 100 or more, more preferably 500 or more, and particularly preferably 1,000 or more, and preferably 500,000 or less, more preferably 250,000 or less, and particularly preferably 100,000 or less. When the weight average molecular weight of the water-soluble polymer is set to be equal to or more than the lower limit of the aforementioned range, the strength of the water-soluble polymer can be enhanced, and a stable protective layer covering the electrode active material can be formed. Therefore, it is possible to improve, e.g., dispersibility of the electrode active material, and high-temperature storage property of the lithium ion secondary battery. On the other hand, when the molecular weight is set to be equal to or less than the upper limit of the aforementioned range, the water-soluble polymer can be made soft. Therefore, it is possible to realize, e.g., suppression of electrode expansion, and improvement in adhesion of the electrode active material layer to the current collector.

The weight average molecular weight of the water-soluble polymer may be determined as the value in terms of polystyrene by gel permeation chromatography (GPC) using a solution in which 0.85 g/mL sodium nitrate is dissolved in a 10% by volume aqueous solution of dimethyl formamide as a developing solvent.

The glass transition temperature of the water-soluble polymer is usually 0° C. or higher, and preferably 5° C. or higher, and usually 100° C. or lower, and preferably 50° C. or lower. When the glass transition temperature of the water-soluble polymer falls within the aforementioned range, both the adhesion and the flexibility of the electrode can be achieved simultaneously. The glass transition temperature of the water-soluble polymer may be adjusted by the combination of a variety of monomers.

In the electrode for a lithium ion secondary battery of the present invention, one species of the water-soluble polymer may be solely used, or two or more species thereof may be used in combination at any ratio.

In the electrode for a lithium ion secondary battery of the present invention, the amount of the water-soluble polymer is preferably 0.1 parts by weight or more, more preferably 0.2 parts by weight or more, and particularly preferably 0.5 parts by weight or more, and preferably 30 parts by weight or less, more preferably 25 parts by weight or less, and particularly preferably 20 parts by weight or less, relative to 100 parts by weight of the electrode active material. When the amount of the water-soluble polymer is set to be equal to or more than the lower limit of the aforementioned range, the adhesion of the electrode active material to the current collector can be improved, and a lithium ion secondary battery having excellent storage property and cycle property in a high temperature environment can be realized. On the other hand, when the amount of the water-soluble polymer is set to be equal to or less than the upper limit of the aforementioned range, the relative amount of the electrode active material can be increased, and the capacity of the lithium ion secondary battery can be thereby increased.

The water-soluble polymer may be produced by, e.g., polymerization of a monomer composition containing an aromatic vinyl monomer, an unsaturated carboxylic acid monomer, a crosslinkable monomer, and if necessary, an optional monomer in an aqueous solvent. At this time, the ratio of each monomer in the monomer composition is usually adjusted to the same ratio as that of the structural unit in the water-soluble polymer.

The aqueous solvent is not especially limited as long as the water-soluble polymer can be dissolved therein. An aqueous solvent having a boiling point at normal pressure of usually 80° C. or higher, and preferably 100° C. or higher, and usually 350° C. or lower, and preferably 300° C. or lower is usually used. Examples of the aqueous solvent may be as follows. In the following examples, numeral in parentheses after each solvent name represents a boiling point (unit: ° C.) at normal pressure, which is a value calculated by rounding off or rounding down the fractions to the nearest whole number.

Examples of the aqueous solvent may include water (100); ketones such as diacetone alcohol (169) and γ-butyrolactone (204); alcohols such as ethyl alcohol (78), isopropyl alcohol (82), and normal propyl alcohol (97); glycol ethers such as propylene glycol monomethyl ether (120), methyl cellosolve (124), ethyl cellosolve (136), ethylene glycol tert-butyl ether (152), butyl cellosolve (171), 3-methoxy-3-methyl-1-butanol (174), ethylene glycol monopropyl ether (150), diethylene glycol monobutyl ether (230), triethylene glycol monobutyl ether (271), and dipropylene glycol monomethyl ether (188); and ethers such as 1,3-dioxolane (75), 1,4-dioxolane (101), and tetrahydrofuran (66). Among them, water is particularly preferable since it has no combustibility and the water-soluble polymer is easily obtained.

As the aqueous solvent, one species thereof may be solely used, or two or more species thereof may be used in combination at any ratio. For example, a mixture of water as a main solvent with an aqueous solvent other than water among the aforementioned solvents within a range in which dissolution of the water-soluble polymer can be secured may be used.

The polymerization method is not particularly limited. For example, any method such as a solution polymerization method, a suspension polymerization method, a bulk polymerization method, and an emulsion polymerization method may be used. As the polymerization method, any method such as ion polymerization, radical polymerization, and living radical polymerization may be used.

Polymerization temperature and polymerization time may be optionally set depending on the polymerization method and type of polymerization initiator. Usually, the polymerization temperature is about 30° C. or higher and the polymerization time is about 0.5 hours to 30 hours.

As a polymerization auxiliary agent, an additive such as amines may be used.

In accordance with the aforementioned method, a reaction liquid containing the water-soluble polymer can be obtained. The resulting reaction liquid is usually acidic, and the water-soluble polymer is often dispersed in the aqueous solvent. Usually, such a water-soluble polymer dispersed in the aqueous solvent can be made soluble in the aqueous solution by, e.g., adjusting the pH of the reaction liquid to 7 to 13. The water-soluble polymer may be isolated from the aqueous solution thus obtained. However, a slurry composition may be usually produced using the water-soluble polymer in a state of being dissolved in the aqueous solvent, and an electrode may be produced using the slurry composition.

As described above, the aqueous solution containing the water-soluble polymer in the aqueous solvent is usually acidic. If necessary, the solution may be alkalized to a pH of 7 to 13. By such treatment, the handling property of the aqueous solution can be improved, and the application properties of the slurry composition for producing an electrode for a lithium ion secondary battery can be improved. Examples of a method for alkalizing the aqueous solution to a pH of 7 to 13 may include a method of adding an aqueous alkaline solution including an aqueous alkali metal solution such as an aqueous lithium hydroxide solution, an aqueous sodium hydroxide solution, and an aqueous potassium hydroxide solution; an aqueous alkali earth metal solution such as an aqueous calcium hydroxide solution and an aqueous magnesium hydroxide solution; or an aqueous ammonia solution. As the aqueous alkaline solution, one species thereof may be solely used, or two or more species thereof may be used in combination at any ratio.

[1.3. Particulate Binder]

The electrode for a lithium ion secondary battery of the present invention may contain a particulate binder. The particulate binder is usually contained in the electrode active material layer, and exerts an action of binding the electrode active material and the current collector. Since the particulate binder is contained in addition to the water-soluble polymer, the electrode active material can be tightly held in the electrode for a lithium ion secondary battery, whereby the detachment of the electrode active material from the electrode for a lithium ion secondary battery can be further suppressed. Usually, the particulate binder also binds particles other than the electrode active material in the electrode active material layer, to play a role of maintaining strength of the electrode active material layer. In particular, since the particulate binder has a particle shape, the particulate binder has an especially high binding ability. Therefore, the particulate binder can remarkably suppress a decrease in capacity of the electrode for a lithium ion secondary battery and degradation caused by repeated charging and discharging. As the particulate binder, those which can exist in a state of retaining particle shape in the slurry composition for producing an electrode for a lithium ion secondary battery may be used. Preferable are those which can exist in a state of retaining particle shape even in the electrode active material layer. In the present invention, "the state of retaining a particle shape" does not have to be a state of completely retaining particle shape, and may be a state of retaining particle shape to some extent.

The compound for forming the particulate binder is not particularly limited as long as it is a compound capable of mutually binding the electrode active material and an electroconductive material for an electrode as described later. A suitable particulate binder is a dispersible binder having dispersibility in a solvent. Specific examples thereof may include polymer compounds such as a fluorine polymer, a diene polymer, an acrylate polymer, a polyimide, a polyamide, and a polyurethane polymer. Among them, a fluorine polymer, a diene polymer, and an acrylate polymer are preferable, and a diene polymer and an acrylate polymer are more preferable since they can enable high withstanding voltage and high energy density of electrochemical element.

The diene polymer is a homopolymer of conjugated diene; a copolymer of different types of conjugated dienes; a copolymer obtained by polymerization of a monomer mixture containing a conjugated diene, or a hydrogenated product thereof.

The containing ratio of the conjugated diene in the monomer mixture is usually 20% by weight or more, and preferably 25% by weight or more. Specific examples of the diene polymer may include conjugated diene homopolymers such as polybutadiene and polyisoprene; aromatic vinyl-conjugated diene copolymers such as a styrene-butadiene copolymer (SBR) which may be modified by carboxyl; vinyl cyanide-conjugated diene copolymers such as an acrylonitrile-butadiene copolymer (NBR); hydrogenated SBR, and hydrogenated NBR. As the conjugated diene, one species thereof may be solely used, or two or more species thereof may be used in combination at any ratio. The containing ratio of a conjugated diene monomer unit in the diene polymer is preferably 20% by weight or more, and more preferably 30% by weight or more, and preferably 60% by weight or less, and more preferably 55% by weight or less.

The acrylate polymer is a polymer obtained by polymerization of a monomer mixture containing a compound represented by a general formula (III): $CH_2=CR^6-COOR^7$ (in the general formula (III), $R^6$ represents a hydrogen atom or a methyl group, and $R^7$ represents an alkyl group or a cycloalkyl group).

Specific examples of the compound represented by the general formula (III) may include acrylates such as ethyl acrylate, propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, hexyl acrylate, nonyl acrylate, lauryl acrylate, and stearyl acrylate; and methacrylates such as ethyl methacrylate, propyl methacrylate, isopropyl methacrylate, n-butyl methacrylate, isobutyl methacrylate, t-butyl methacrylate, n-amyl methacrylate, isoamyl methacrylate, n-hexyl methacrylate, 2-ethylhexyl methacrylate, octyl methacrylate, isodecyl methacrylate, lauryl methacrylate, tridecyl methacrylate, and stearyl methacrylate. Among them, acrylates are preferable, and n-butyl acrylate and 2-ethylhexyl acrylate are particularly preferable since they can improve strength of the electrode for a lithium ion secondary battery. As these monomers, one species thereof may be solely used, or two or more species thereof may be used in combination at any ratio.

The ratio of a monomer unit obtained by polymerization of acrylic acid ester and/or methacrylic acid ester in the acrylate polymer is preferably 50% by weight or more, and preferably 70% by weight or more. When the ratio of the monomer unit obtained by polymerization of acrylic acid ester and/or methacrylic acid ester is set to be within the aforementioned range, the heat resistance of the particulate binder can be improved, and the internal resistance of the electrode for a lithium ion secondary battery can be decreased.

In addition to the compound represented by the general formula (III), a carboxylic acid group-containing monomer that is copolymerizable with the compound represented by the general formula (III) may be used as a monomer of the acrylate polymer. Specific examples of the carboxylic acid group-containing monomer may include monobasic acid-containing monomers such as acrylic acid and methacrylic acid; and dibasic acid-containing monomers such as maleic acid, fumaric acid, and itaconic acid. Among them, the dibasic acid-containing monomers are preferable, and itaconic acid is particularly preferable since therewith binding property can be enhanced and electrode strength can be increased. As the carboxylic acid group-containing monomer, one species thereof may be solely used, or two or more species thereof may be used in combination at any ratio.

The amount of the carboxylic acid group-containing monomer is preferably 0.1 parts by weight or more, more preferably 0.5 parts by weight or more, and particularly preferably 1 part by weight or more, and preferably 50 parts by weight or less, more preferably 20 parts by weight or less, and particularly preferably 10 parts by weight or less, relative to 100 parts by weight of the compound represented by the general formula (III). When the amount of the carboxylic acid group-containing monomer is set to be within this range, binding property can be enhanced and electrode strength can be increased.

In addition to the compound represented by the general formula (III), a nitrile group-containing monomer that is copolymerizable with the compound represented by the general formula (III) may be used as the monomer of the acrylate polymer. Specific examples of the nitrile group-containing monomer may include acrylonitrile and methacrylonitrile. Among them, acrylonitrile is preferable since therewith binding property can be enhanced and electrode strength can be increased. As the nitrile group-containing monomer, one species thereof may be solely used, or two or more species thereof may be used in combination at any ratio.

The amount of the nitrile group-containing monomer is preferably 0.1 parts by weight or more, more preferably 0.5 parts by weight or more, and particularly preferably 1 part by weight or more, and preferably 40 parts by weight or less, more preferably 30 parts by weight or less, and particularly preferably 20 parts by weight or less, relative to 100 parts by weight of the compound represented by the general formula (III). When the amount of the nitrile group-containing monomer is set to be within this range, binding property can be enhanced and electrode strength can be increased.

The weight average molecular weight of the polymer for forming the particulate binder is preferably 10,000 or more, and more preferably 20,000 or more, and preferably 1,000,000 or less, and more preferably 500,000 or less. When the weight average molecular weight of the polymer for forming the particulate binder falls within the aforementioned range, the strength of the electrode for a lithium ion secondary battery and the dispersibility of the electrode active material can be easily improved. The weight average molecular weight of the particulate binder may be determined as the value in terms of polystyrene by GPC using tetrahydrofuran as a developing solvent.

The glass transition temperature (Tg) of the particulate binder is preferably 50° C. or lower, and further preferably 0° C. or lower, and usually −40° C. or higher. When the glass transition temperature (Tg) of the particulate binder falls within this range, excellent binding property, high electrode strength, and high flexibility can be obtained even using a small amount of the binder, and electrode density can be easily enhanced by a pressing process during formation of an electrode.

The polymer for forming the particulate binder is usually water-insoluble. Therefore, the particulate binder usually has a particle shape in the slurry composition for producing an electrode for a lithium ion secondary battery, and is contained in the electrode for a lithium ion secondary battery while keeping the particle shape.

The number average particle diameter of the particulate binder is usually 0.01 μm or larger, preferably 0.03 μm or larger, and more preferably 0.05 μm or larger, and usually 1 μm or smaller, preferably 0.8 μm or smaller, and more preferably 0.5 μm or smaller. When the number average particle diameter of the particulate binder falls within this range, excellent binding power may be exerted even small amount of use. The number average particle diameter is a value obtained by measuring the diameters of 100 binder particles which have been selected randomly on a transmission electron microscope image and calculating an arithmetic average value. The shape of the particle may be sphere or heteromorphy.

As the particulate binder, one species thereof may be solely used, or two or more species thereof may be used in combination at any ratio.

The amount of the particulate binder is usually 0.1 parts by weight or more, preferably 0.5 parts by weight or more, and more preferably 1 part by weight or more, and usually 50 parts by weight or less, preferably 20 parts by weight or less, and more preferably 10 part by weight or less, relative to 100 parts by weight of the electrode active material. When the amount of the particulate binder is set to be within this range, the adhesion can be surely attained, the capacity of the lithium ion secondary battery can be increased, and the internal resistance of the electrode for a lithium ion secondary battery can be decreased.

For example, the particulate binder may be produced by polymerizing the monomer composition containing the monomers in an aqueous solvent to form polymer particles. The ratio of each monomer in the monomer composition is usually adjusted to the same ratio as that of the structural unit in the particulate binder.

Examples of the aqueous solvent may include the same aqueous solvents as those described in the method for producing the water-soluble polymer.

As the polymerization method, any method such as a solution polymerization method, a suspension polymerization method, a bulk polymerization method, and an emulsion polymerization method may be used. As the polymerization method, any method such as ion polymerization, radical polymerization, and living radical polymerization may be used. Among them, the emulsion polymerization method is particularly preferable from the viewpoints of manufacturing efficiencies, such as the facts that a polymer having a high molecular weight is easily obtained, and that re-dispersion treatment is unnecessary and the polymer may be used as it is as the slurry composition for producing an electrode for a lithium ion secondary battery because the polymer is obtained in a state of particles which are dispersed in water.

The emulsion polymerization method is usually performed in accordance with a conventional method. For example, polymerization may be performed in accordance with a method described in "*Jikken Kagaku Kouza* (Course of Experimental Chemistry)", vol. 28 (published by Maruzen Publishing Co., Ltd., and edited by The Chemical Society of Japan). Specifically, a method in which water, an additive such as a dispersing agent, an emulsifier, and a crosslinking agent, a polymerization initiator, and a monomer are placed in a sealed vessel equipped with a stirrer and a heating device so that the mixture has a predetermined composition, the composition in the vessel is stirred to emulsify the monomer, etc. in water, and the temperature is increased under stirring so as to initiate polymerization may be used. Alternatively, a method in which the composition is emulsified and then placed in a sealed vessel, and the reaction is initiated in a similar manner may be used.

Examples of the polymerization initiator may include organic peroxides such as lauroyl peroxide, diisopropyl peroxydicarbonate, di-2-ethylhexyl peroxydicarbonate, t-butyl peroxypivalate, and 3,3,5-trimethyl hexanoyl peroxide; azo compounds such as $\alpha,\alpha'$-azobisisobutyronitrile; ammonium persulfate; and potassium persulfate. As the polymerization initiator, one species thereof may be solely used, or two or more species thereof may be used in combination at any ratio.

The emulsifier, the dispersing agent, and the polymerization initiator are those generally used in these polymerization methods. Usually the using amount thereof is set to general using amount. In the polymerization, seed polymerization using seed particles may be performed.

Further, the pH of an aqueous dispersion of particulate binder obtained by these methods may be adjusted within a range of usually 5 to 10, and preferably 5 to 9. The pH may be adjusted by, e.g., mixing a basic aqueous solution containing a hydroxide of alkali metal (for example, Li, Na, K, Rb, and Cs), ammonia, an inorganic ammonium compound (for example, $NH_4Cl$), an organic amine compound (for example, ethanolamine and diethylamine), etc., with the aqueous dispersion of the particulate binder. Among them, pH adjustment using an alkali metal hydroxide is preferable since thereby binding property between the current collector and the electrode active material can be enhanced.

The particulate binder may be complex polymer particles of two or more types of polymers. The complex polymer particles may be obtained by, e.g., a method in which one or more species of monomer component is polymerized through a conventional procedure, followed by polymerization of one or more other species of monomer component, wherein the polymerization is performed in accordance with a conventional procedure (two-step polymerization method). When the monomers are thus polymerized in a stepwise procedure, particles having a core-shell structure that has a core layer in the inside of the particles and a shell layer coating the core layer can be obtained.

[1.4. Optional Component]

In addition to the electrode active material, the water-soluble polymer, and the particulate binder, the electrode for a lithium ion secondary battery of the present invention may contain an optional component as long as the effects of the present invention are not significantly impaired. For example, the electrode for a lithium ion secondary battery of the present invention may contain an electroconductive material for an electrode, a dispersing agent, a reinforcing material, a leveling agent, nanoparticles, and an additive. These optional components are usually contained in the electrode active material layer. As the optional component, one species thereof may be solely used, or two or more species thereof may be used in combination at any ratio.

Examples of the electroconductive material for an electrode may include electroconductive particles formed from an allotrope of carbon. Examples of the allotrope of carbon for forming such an electroconductive material for an electrode may include electroconductive carbon material black such as furnace black, acetylene black, and ketjen black (registered trademark of Akzo Nobel Chemicals B.V.). Among them, acetylene black and furnace black are preferable. As the electroconductive material for an electrode, one species thereof may be solely used, or two or more species thereof may be used in combination at any ratio.

It is preferable that the volume average particle diameter of the electroconductive material for an electrode is smaller than the volume average particle diameter of the electrode active material. The specific range of volume average particle diameter of the electroconductive material for an electrode is usually 0.001 μm or more, preferably 0.05 μm or more, and more preferably 0.01 μm or more, and usually 10 μm or less, preferably 5 μm or less, and more preferably 1 μm or less. When the volume average particle diameter of the electroconductive material for an electrode falls within this range, high conductivity can be obtained with a small using amount of the material.

The amount of the electroconductive material for an electrode is usually 0.1 parts by weight or more, preferably 0.5 parts by weight or more, and more preferably 1 part by weight or more, and usually 50 parts by weight or less, preferably 15 parts by weight or less, and more preferably 10 part by weight or less, relative to 100 parts by weight of the electrode active material. When the amount of the electroconductive material for an electrode is set to be within this range, the capacity of the lithium ion secondary battery can be increased, and the internal resistance of the electrode for a lithium ion secondary battery can be decreased.

Examples of the dispersing agent may include cellulose-based polymers such as carboxymethyl cellulose, methyl cellulose, ethyl cellulose, and hydroxypropyl cellulose, and ammonium salts and alkali metal salts thereof; poly(meth)acrylic acid salts such as sodium poly(meth)acrylate; and polyvinyl alcohol, modified polyvinyl alcohol, polyethylene oxide, polyvinylpyrrolidone, polycarboxylic acid, oxidized starch, starch phosphate, casein, and various modified starches. Among them, a cellulose-based polymer is preferable, and carboxymethyl cellulose, and an ammonium salt and an alkali metal salt thereof are particularly preferable. As the dispersing agents, one species thereof may be solely used, or two or more species thereof may be used in combination at any ratio.

The amount of the dispersing agent is usually 0.1 parts by weight or more, preferably 0.5 parts by weight or more, and more preferably 0.8 part by weight or more, and usually 10 parts by weight or less, preferably 5 parts by weight or less, and more preferably 2 parts by weight or less, relative to 100 parts by weight of the electrode active material.

As the reinforcing material, e.g., a variety of inorganic or organic fillers in a spherical shape, a plate shape, a rod shape, or a fiber shape may be used. As the reinforcing agents, one species thereof may be solely used, or two or more species thereof may be used in combination at any ratio. Using the reinforcing material, a tough and flexible electrode for a lithium ion secondary battery can be obtained, and a lithium ion secondary battery exerting excellent long-term cycle property can be realized.

The amount of the reinforcing material is usually 0.01 parts by weight or more, and preferably 1 part by weight or more, and usually 20 parts by weight or less, and preferably 10 parts by weight or less, relative to 100 parts by weight of the electrode active material. When the amount of the reinforcing material is set to be within the aforementioned range, the lithium ion secondary battery can exert high capacity and high load property.

Examples of the leveling agent may include surfactants such as an alkyl-based surfactant, a silicone-based surfactant, a fluorine-based surfactant, and a metal-based surfactant. As the leveling agents, one species thereof may be solely used, or two or more species thereof may be used in combination at any ratio. Use of the leveling agent can prevent cissing that occurs during application of the slurry composition for producing an electrode for a lithium ion secondary battery, and can improve the smoothness of the electrode for a lithium ion secondary battery.

The amount of the leveling agent is preferably 0.01 parts by weight to 10 parts by weight relative to 100 parts by weight of the electrode active material. When the amount of the leveling agent is set to be within the aforementioned range, the electrode can be produced with high productivity and high smoothness, and excellent battery property can be obtained. When the surfactant is contained, the dispersibility of the electrode active material, etc. in the slurry composition for producing an electrode for a lithium ion secondary battery can be improved. Further, smoothness of the electrode for a lithium ion secondary battery thus obtained can be improved.

Examples of the nanoparticles may include particles of fumed silica and fumed alumina. As the nanoparticles, one species thereof may be solely used, or two or more species thereof may be used in combination at any ratio. When the nanoparticles are contained, the thixotropy of the slurry composition for producing an electrode for a lithium ion secondary battery can be adjusted. Thus, leveling property of the electrode for a lithium ion secondary battery thus obtained can be improved.

The amount of the nanoparticles is preferably 0.01 parts by weight to 10 parts by weight relative to 100 parts by weight of the electrode active material. When the amount of the nanoparticles is set to be within the aforementioned range, stability and productivity of the slurry composition for producing an electrode for a lithium ion secondary battery can be improved, and high battery property can be realized.

Examples of the additive may include vinylene carbonate. As the additive, one species thereof may be solely used, or two or more species thereof may be used in combination at any ratio. Use of the additive can, e.g., suppress decomposition of electrolytic solution.

The amount of the additive is preferably 0.01 parts by weight to 10 parts by weight relative to 100 parts by weight of the electrode active material. When the amount of the additive is set to be within the aforementioned range, a lithium ion secondary battery having excellent cycle property and high-temperature property can be realized.

[1.5. Current Collector and Electrode Active Material Layer]

The electrode active material, the water-soluble polymer, and a component to be contained if necessary are usually contained in the electrode active material layer, as described above. The electrode active material layer is usually provided on the surface of the current collector. At this time, the electrode active material layer may be provided on one side of the current collector, or on both sides thereof.

The current collector is not particularly limited as long as it is formed from a material having electroconductivity and electrochemical durability. A metal material is particularly preferable since it has heat resistance. Examples of the material for the current collector may include iron, copper, aluminum, nickel, stainless steel, titanium, tantalum, gold, and platinum. Among them, aluminum is preferable for a current collector for a positive electrode, and copper is preferable for a current collector for a negative electrode. As the material for the current collector, one species thereof may be solely used, or two or more species thereof may be used in combination at any ratio.

The shape of the current collector is not particularly limited. The current collector preferably has a sheet shape with a thickness of about 0.001 mm to 0.5 mm.

It is preferable that the surface of the current collector is roughened in advance of use for enhancing the adhesion strength of the current collector to the electrode active material layer. Examples of the roughening method may include a mechanical polishing method, an electrolysis polishing method, and a chemical polishing method. In the mechanical polishing method, polishing paper to which polishing agent particles are fixed, a grindstone, an emery wheel, and a wire brush having steel wire, etc. are usually used. Further, in order to enhance the adhesion strength and conductivity of the electrode active material layer, an intermediate layer may be formed on the surface of the current collector.

The thickness of the electrode active material layer is usually 5 μm or more, preferably 20 μm or more, and more preferably 30 μm or more, and usually 1,000 μm or less, preferably 500 μm or less, and more preferably 300 μm or less. When the thickness of the electrode active material layer falls within the aforementioned range, the load property and the cycle property can be improved.

The containing ratio of the electrode active material in the electrode active material layer is preferably 85% by weight or more, and more preferably 88% by weight or more, and preferably 99% by weight or less, and more preferably 97% by weight or less. When the containing ratio of the electrode active material is set to be within the aforementioned range, an electrode for a lithium ion secondary battery that exerts high capacity as well as flexibility and binding property can be realized.

The density of the electrode active material layer is usually 0.30 $g/cm^3$ or more, preferably 0.35 $g/cm^3$ or more, and more preferably 0.40 $g/cm^3$ or more, and usually 10 $g/cm^3$ or less, preferably 8.0 $g/cm^3$ or less, and more preferably 6.0 $g/cm^3$ or less. When the density of the electrode active material layer falls within the aforementioned range, the balance between high capacity and high output power can be achieved.

The moisture content of the electrode active material layer is preferably 1,000 ppm or less, and more preferably 500 ppm or less. When the moisture content of the electrode active material layer falls within the aforementioned range, an electrode for a lithium ion secondary battery that exerts excellent durability can be realized. The moisture content may be measured by a known method such as Karl Fischer method.

Such a low moisture content may be achieved by appropriately adjusting the composition of structural unit in the water-soluble polymer. In particular, when the fluorine-containing (meth)acrylic acid ester monomer unit is adjusted within a range of usually 0.5% by weight or more, and preferably 1% by weight or more, and usually 20% by weight or less, and preferably 10% by weight or less, low moisture content can achieved.

[2. Method for Producing Electrode]

The electrode for a lithium ion secondary battery of the present invention can be produced by, e.g., a coating method or a powder molding method.

The coating method herein is a production method for obtaining an electrode for a lithium ion secondary battery, wherein a slurry composition for producing an electrode for a lithium ion secondary battery is prepared, and the slurry composition is applied onto a current collector, and then dried, to form an electrode active material layer on the surface of the current collector.

The powder molding method herein is a production method for obtaining an electrode for a lithium ion secondary battery, wherein a slurry composition for producing an electrode for a lithium ion secondary battery is prepared, composite particles containing an electrode active material and a water-soluble polymer are then prepared from the slurry composition, and the composite particles are supplied onto a current collector, and if desired, roll press molding is performed, to form an electrode active material layer.

Among them, the coating method is preferable in terms of excellent adhesion of the electrode active material layer to the current collector. However, the powder molding method is preferable in terms of high capacity and low internal resistance of the electrode for a lithium ion secondary battery, as well as simple process and excellent production cost.

[2.1. Coating Method]

In the coating method, a slurry composition for producing an electrode for a lithium ion secondary battery is prepared. The slurry composition is a fluid composition containing an electrode active material, a water-soluble polymer, and a solvent. When an electrode for a lithium ion secondary battery contains an optional component such as a particulate binder, an electroconductive material for an electrode, a dispersing agent, a reinforcing material, a leveling agent, nanoparticles, and an additive, the slurry composition also contains the optional component. The ratios of the electrode active material, the water-soluble polymer, and the optional component in the slurry composition are usually adjusted to the same ratios as those of the respective components in an electrode active material layer.

As the solvent, water may be used, an organic solvent may also be used, and a combination of water and the organic solvent may also be used. These solvents function as a solvent or a dispersion medium in the slurry composition. In the solvents, the electrode active material can be dispersed, the particulate binder can be dispersed, and the water-soluble polymer can be dissolved.

Examples of the organic solvent may include alkyl alcohols such as methyl alcohol, ethyl alcohol, and propyl alcohol; alkyl ketones such as acetone and methyl ethyl ketone; ethers such as tetrahydrofuran, dioxone, and diglyme; amides such as diethylforamide, dimethylacetamide, N-methyl-2-pyrrolidone, and dimethylimidazolidinone; and sulfo-based solvents such as dimethyl sulfoxide and sulfolane. Among them, alcohols are preferable as the organic solvent. One species of these examples may be solely used, or two or more species thereof may be used in combination at any ratio.

Among them, water is preferable as an excellent solvent because an electrode active material layer can be readily dried and water gives low impact on the environment. When water is used as the solvent, a part of the water-soluble polymer is dissolved in water in the slurry composition. However, another part of the water-soluble polymer is adsorbed on the surface of the electrode active material, and as a result, the electrode active material is coated with a stable layer of the water-soluble polymer, whereby the dispersibility of the electrode active material in water is improved. Therefore, the application property of the slurry composition can be improved.

When water and the organic solvent are combined, the dispersibility of the particulate binder and the solubility of the water-soluble polymer may be adjusted by the amount or type of the organic solvent used in combination with water. Thus, the viscosity and flowability of the slurry composition can be adjusted, and the production efficiency can be improved.

It is preferable that an organic solvent in which the particulate binder and the water-soluble polymer can be dissolved is combined with water because the particulate binder and the water-soluble polymer are adsorbed on the surface of the electrode active material, to thereby stabilize the dispersion of the electrode active material.

The amount of the solvent is such an amount that the concentration of solid content contained in the slurry composition falls within a range of usually 1% by weight or more, preferably 5% by weight or more, and more preferably 10% by weight or more, and usually 90% by weight or less, preferably 85% by weight or less, and more preferably 80% by weight or less. When the solid content concentration falls within this range, each component is uniformly dispersed, and therefore this is suitable.

The viscosity of the slurry composition at room temperature is usually 10 mPa·s or more, preferably 30 mPa·s or more, and more preferably 50 mPa·s or more, and usually 100,000 mPa·s or less, preferably 50,000 mPa·s or less, and more preferably 20,000 mPa·s or less. When the viscosity falls within this range, the productivity can be improved.

The slurry composition for producing an electrode for a lithium ion secondary battery may be produced by mixing an electrode active material, a water-soluble polymer, a solvent, and, if necessary, optionally used components. In this case, a specific procedure may be arbitrary performed. For example, for producing a slurry composition containing an electrode active material, a water-soluble polymer, a particulate binder, and an electroconductive material for an electrode is produced, a method in which the electrode active material, the water-soluble polymer, the electroconductive material for an electrode, and the particulate binder are simultaneously mixed in a solvent; a method in which the water-soluble polymer is dissolved in a solvent, the particulate binder dispersed in a solvent is mixed therewith, and the electrode active material and the electroconductive material for an electrode are then mixed therewith; and a method in which the electrode active material and the electroconductive material for an electrode are mixed with the particulate binder dispersed in a solvent, and the water-soluble polymer dissolved in a solvent is mixed with the mixture, are exemplified.

Examples of a mixing means may include mixers such as a ball mill, a sand mill, a bead mill, a pigment dispersing machine, a grinder, an ultrasonic dispersion machine, a homogenizer, a homomixer, and a planetary mixer. Mixing is usually performed in a range of room temperature to 80° C. for 10 minutes to several hours.

After the slurry composition is prepared, the slurry composition is then applied onto a current collector. The slurry composition of the present invention has excellent dispersion stability since the slurry composition contains a water-soluble polymer containing an aromatic vinyl monomer unit, an unsaturated carboxylic acid monomer unit, and a crosslinkable monomer unit at a specific ratio. Therefore, uniform application of the slurry composition can be easily performed.

There is no limitation to the coating method, and examples thereof may include methods such as a doctor blade method, a dip coating method, a reverse roll method, a direct roll method, a gravure method, an extrusion method, and a brush coating method. By performing application of the slurry composition, a layer of the slurry composition is formed on the surface of the current collector. Upon performing the application, the thickness of the slurry composition layer may be appropriately set in accordance with the targeted thickness of the electrode active material layer.

Subsequently, a liquid such as water is removed from the slurry composition layer by drying, whereby an electrode active material layer containing an electrode active material and a water-soluble polymer is formed on the surface of the current collector, and the electrode for a lithium ion secondary battery of the present invention is thus obtained.

Examples of the drying method may include drying with warm air, hot air, or low humid air; vacuum drying; and a drying method by irradiation of (far) infrared radiation or electron beam. Among them, the drying method by irradiating far infrared radiation is preferable.

It is preferable that drying temperature and drying time are the temperature and time within which the solvent in the slurry composition that has been applied onto the current collector can be completely removed. The specific range of the drying temperature is usually 100° C. or higher, and preferably 120° C. or higher, and usually 300° C. or lower, and preferably 250° C. or lower. The drying time is usually 10 minutes or more, and preferably 20 minutes or more, and usually 100 hours or less, and preferably 20 hours or less.

If necessary, after the electrode active material layer is formed on the surface of the current collector, the electrode active material layer may be subjected to pressurization treatment using, e.g., die press or roll press. This pressurization treatment can decrease the porosity of the electrode active material layer. The porosity is preferably 5% or more, and more preferably 7% or more, and preferably 30% or less, and more preferably 20% or less. When the porosity is set to be equal to or higher than the lower limit of the aforementioned range, high volume capacity can be easily obtained, and the negative electrode active material layer becomes less likely to be separated from the current collector. When the porosity is set to be equal to or lower than the upper limit, high charging efficiency and high discharging efficiency can be obtained.

When the electrode active material layer contains a curable polymer, the polymer may be cured after formation of the electrode active material layer.

[2.2. Powder Molding Method]

In the powder molding method, firstly, a slurry composition for producing an electrode for a lithium ion secondary battery may be prepared. The slurry composition may be prepared in a similar manner to that in the coating method. However, as the solvent in the slurry composition, combination of water and an organic solvent having a boiling point lower than that of water is preferably used. By using such a solvent, the drying speed can be increased during spray-drying.

After preparing the slurry composition, composite particles are then produced from the slurry composition. Since the composite particles are produced from the slurry composition, components such as an electrode active material and a water-soluble polymer in the slurry composition are integrated to form particles.

In the composite particles, components such as an electrode active material and a particulate binder in the slurry composition do not separately exist as independent particles, but a plurality of components such as an electrode active material and a particulate binder are combined together to form a particle. Specifically, two or more particles (primary particles) are bound to form a secondary particle as a mass of bound primary particles. In particular, it is preferable that a plurality of (preferably several to tens of) electrode active materials are bound via the water-soluble polymer and the optional particulate binder, to form a composite particle. By using such particles, the adhesion of the electrode active material layer in the electrode for a lithium ion secondary battery can be further enhanced, and the internal resistance of the lithium ion secondary battery can be decreased.

The composite particles may be produced by granulating the slurry composition. Examples of the method for granulating the composite particles may include a granulation method such as a spray-drying granulation method, a dynamic layer granulation method, a compression granulation method, a stirring granulation method, an extrusion granulation method, a crushing granulation method, a fluidized layer granulation method, a fluidized layer multifunctional granulation method, a pulse combustion system drying method, and a melting granulation method.

Among them, the spray-drying granulation method is preferable since thereby composite particles in which the water-soluble polymer, and the optional particulate binder and electroconductive material for an electrode are locally distributed in the proximity of the surface of the composite particles can be easily obtained. Using composite particles obtained by the spray-drying granulation method, an electrode for a lithium ion secondary battery can be obtained with high productivity. In addition, the internal resistance of the electrode for a lithium ion secondary battery can be further decreased.

In the spray-drying granulation method, the slurry composition is granulated by spray-drying, to obtain composite particles. In the spray-drying, the slurry composition is sprayed into a hot air, to perform drying.

Examples of the device for use in spraying the slurry composition may include an atomizer. Atomizers are classified into devices of two types that are a rotary disk system and a pressurization system.

The rotary disk system is a system in which the slurry composition is supplied to the approximately center of a disk that is rotating at high speed, and the slurry composition is then scattered outside the disk by the centrifugal force of the disk, whereby the slurry composition is atomized. The rotation speed of the disk depends on the size of the disk, and is usually 5,000 rpm or more, and preferably 15,000 rpm or more, and usually 40,000 or less, and preferably 40,000 or less. The lower the rotation speed of the disk is, the larger the size of atomized droplets becomes and hence the larger the weight average particle diameter of the resultant composite particles tends to become.

Examples of a rotary disk system atomizer may include a pin type atomizer and a vane type atomizer. Among them, the pin type atomizer is preferable. The pin type atomizer is one type of centrifugal spraying device using a spraying disk. The pin type atomizer has a configuration in which the spraying disk is equipped with a plurality of spraying rollers that are detachably mounted between upper and lower attachment disks on concentric circles along the peripheral edge of the disk. The slurry composition is introduced from the center of the spraying disk. The slurry composition then adheres to the spraying rollers by centrifugal force, moves on the surface of the rollers towards the outside, and is finally released from the surface of the rollers, to accomplish spraying.

On the other hand, the pressurization system is a system in which the slurry composition is pressurized, and then atomized from a nozzle for drying.

The temperature of the sprayed slurry composition is usually room temperature, but may be equal to or higher than room temperature by heating.

The hot air temperature during spray-drying is usually 80° C. or higher, and preferably 100° C. or higher, and usually 250° C. or lower, and preferably 200° C. or lower.

In spray-drying, examples of modes for introducing the hot air may include a mode in which the hot air direction and the spraying direction are parallel in a horizontal direction; a mode in which the slurry composition is sprayed from the top of a drying tower and runs down together with the hot air; a mode in which sprayed drops and the hot air are brought into counterflow contact with each other; and a mode in which sprayed drops firstly flow in parallel with the hot air, and then fall down due to the gravity to come into counterflow contact with the hot air.

It is preferable that the shape of the composite particles is substantially spherical. That is, the sphericity of the composite particles is preferably 80% or more, and more preferably 90% or more. The sphericity (%) herein is defined as a value of $(1-(Ll-Ls)/La) \times 100$. Ls represents the minor axis diameter of the composite particle, Ll represents the long axis diameter of the composite particle, and $La=(Ls+Ll)/2$. The minor axis diameter Ls and the major axis diameter Ll are values measured from a transmission electron microscope image.

The volume average particle diameter of the composite particles is usually 10 μm or larger, preferably 20 μm or larger, and more preferably 30 μm or larger, and usually 100 μm or smaller, preferably 80 μm or smaller, and more preferably 60 μm or smaller.

The resulting composite particles are supplied onto the current collector. In the step of supplying the composite particles onto the current collector, a feeder is usually used. It is preferable that this feeder is a quantitative feeder capable of quantitatively supplying the composite particles. "Capable of quantitatively supplying" herein refers to that a CV value ($=\sigma m/m \times 100$) is 4 or less, wherein the CV value is obtained by continuously supplying the composite particles using such a feeder, measuring the supplying amount a plurality of times at regular intervals, and calculating the CV value from the average value m and the standard deviation σm of the measured values. It is particularly preferable that the CV value is 2 or less.

Specific examples of the quantitative feeder may include a gravity feeder such as a table feeder and a rotary feeder; and a mechanical force feeder such as a screw feeder and a belt feeder. Among them, a rotary feeder is suitable.

The composite particles supplied to the current collector is then molded to form the electrode active material layer containing the electrode active material and the water-soluble polymer on the surface of the current collector, to thereby obtain the electrode for a lithium ion secondary battery of the present invention. Usually, the current collector and the supplied composite particles are pressurized using a pair of rolls to form an electrode active material layer on the current collector as a layer of the composite particles.

It is preferable that the supplied composite particles are heated. Specific temperature of the supplied composite particles is preferably 40° C. or higher, and more preferably 70° C. or higher, and preferably 160° C. or lower, and more preferably 140° C. or lower. When the temperature of the composite particles is set to be within this range, sliding of the composite particles on the surface of the rolls is suppressed, and the composite particles are continuously and uniformly supplied to the rolls, whereby an electrode active material layer having uniform thickness and small variation of electrode density can be obtained.

The temperature during molding is usually 0° C. to 200° C. When a particulate binder is used, the temperature during molding is preferably higher than the melting point or glass transition temperature of the particulate binder, and more preferably higher than the melting point or glass transition temperature by 20° C. or higher.

The molding speed by the rolls is usually higher than 0.1 m/min, preferably 35 m/min or more, and preferably 70 m/min or less.

The linear pressure pressed by the pair of rolls is usually 0.2 kN/cm or more, and preferably 0.5 kN/cm or more, and usually 30 kN/cm or less, and preferably 10 kN/cm or less.

In the powder molding method, arrangement of the pair of rolls is not particularly limited, and it is preferable that the rolls are arranged substantially horizontally or substantially vertically. When the rolls are arranged substantially horizontally, the current collector is continuously supplied between the pair of rolls, and the composite particles are supplied to at least one of the rolls, whereby the composite particles are supplied to a gap between the current collector and the roll. Further, the composite particles are pressurized to form an electrode active material layer. When the rolls are arranged substantially vertically, the current collector is transferred in a horizontal direction. The composite particles are supplied onto the current collector, and, if necessary, the supplied composite particles are made uniform using a blade. The current collector is then supplied to a gap between the pair of rolls, and the composite particles are pressurized to form an electrode active material layer.

When the electrode active material layer contains a curable polymer, it is preferable that the polymer is cured after formation of the electrode active material layer.

[3. Lithium Ion Secondary Battery]

The lithium ion secondary battery of the present invention comprises a positive electrode, a negative electrode, an electrolytic solution, and a separator. In the lithium ion secondary battery of the present invention, at least one of the negative electrode and the positive electrode is the electrode for a lithium ion secondary battery of the present invention.

Since the lithium ion secondary battery of the present invention has the electrode for a lithium ion secondary battery of the present invention, the lithium ion secondary battery has excellent storage property and cycle property in a high temperature environment. Usually, the lithium ion secondary battery of the present invention can exhibit suppressed expansion of the electrode due to charging and discharging, and has excellent low-temperature output property.

[3.1. Electrolytic Solution]

As the electrolytic solution, a solution in which a lithium salt as a supporting electrolyte is dissolved in a non-aqueous solvent may be used. Examples of the lithium salt may include lithium salts such as $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. In particular, $LiPF_6$, $LiClO_4$, and $CF_3SO_3Li$, which is highly soluble in a solvent and shows a high dissociation degree, is suitably used. One species of these examples may be solely used, or two or more species thereof may be used in combination at any ratio.

The amount of the supporting electrolyte is usually 1% by weight or more, and preferably 5% by weight or more, and usually 30% by weight or less, and preferably 20% by weight or less, relative to the electrolytic solution. When the amount of the supporting electrolyte is too small or too large, the ion conductivity decreases, and the charging property and discharging property of the lithium ion secondary battery may possibly decrease.

The solvent used for the electrolytic solution is not particularly limited as long as the supporting electrolyte can be dissolved therein. Examples of the solvent used may include alkyl carbonates such as dimethyl carbonate (DMC), ethylene carbonate (EC), diethyl carbonate (DEC), propylene carbonate (PC), butylene carbonate (BC), and methylethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Dimethyl carbonate, ethylene carbonate, propylene carbonate, diethyl carbonate, and methyl ethyl carbonate are preferable because particularly high ion conductivity can be easily obtained with these solvents, and these solvents can be used in a wide temperature range. As the solvent, one species thereof may be solely used, or two or more species thereof may be used in combination at any ratio.

If necessary, the electrolytic solution may further contain an additive. As the additive, a carbonate compound such as vinylene carbonate (VC) is preferable. As the additive, one species thereof may be solely used, or two or more species thereof may be used in combination at any ratio.

Examples of the electrolytic solutions other than aforementioned ones may include gelled polymeric electrolyte in which a polymeric electrolyte such as polyethylene oxide and polyacrylonitrile is impregnated with an electrolytic solution; and an inorganic solid electrolyte such as lithium sulfide, LiI, and $Li_3N$.

[3.2. Separator]

As the separator, a porous substrate having a pore portion is usually used. Examples of the separator may include (a) a porous separator having a pore portion, (b) a porous separator having a polymer coating layer formed on one or both sides, and (c) a porous separator having a porous resin coating layer containing an inorganic ceramic powder. Examples thereof may include polypropylene-based, polyethylene-based, polyolefinic, and aramid-based porous separators, polymer films for a solid polymer electrolyte or a gelled polymer electrolyte that are made of polyvinylidene fluoride, polyethylene oxide, polyacrylonitrile, or a polyvinylidene fluoride hexafluoropropylene copolymer; a separator coated with a gelled polymer coating layer; and a separator coated with a porous membrane layer formed of an inorganic filler and a dispersing agent for the inorganic filler.

[3.3. Method for Producing Secondary Battery]

The method for producing the lithium ion secondary battery of the present invention is not particularly limited. For example, the positive electrode and the negative electrode may be stacked with the separator interposed therebetween, and the resulting article may be wound or folded in conformity with the shape of the battery, and then put in a battery container. Subsequently, the electrolytic solution may be poured into the battery container, and the container may be sealed. If necessary, expanded metal; an over-current protection element such as fuse and a PTC element; a lead board; etc. may also be put in for preventing an increase in the pressure inside the battery and overcharging and overdischarging. The shape of the battery may be any of a laminated cell shape, a coin shape, a button shape, a sheet shape, a cylindrical shape, a rectangular shape, and a flat shape.

EXAMPLES

The present invention will be specifically described hereinbelow with reference to Examples. However, the present invention is not limited to the following Examples. The present invention may be arbitrarily modified without departing from the scope of claims of the present invention and an equivalent thereof.

Unless otherwise stated, "%" and "part(s)" that represent an amount in the following description are based on weight. Unless otherwise stated, operations in the following description were performed under conditions of normal temperature and normal pressure.

[Evaluation Method]

1. Adhesion Strength

Each electrode produced in Examples and Comparative Examples was cut into a rectangle having a length of 100 mm and a width of 10 mm as a test piece. A cellophane tape was attached to the surface of the electrode active material layer of the test piece with the surface of the electrode active material layer facing downward. As the cellophane tape, a product defined by JIS 21522 was used. The cellophane tape was fixed on a test stand. Then an end of the current collector was vertically pulled upward at a tensile speed of 50 mm/min for peeling off, and the stress at that time was measured. The measurement was repeated 3 times, and an average value was calculated. This average value was taken as peel strength. High peel strength is indicative of strong binding power of the negative electrode active material layer to the current collector, i.e., great adhesion strength.

2. High-Temperature Storage Property

Each laminated cell lithium ion secondary battery produced in Examples and Comparative Examples was allowed to stand for 24 hours. Then, in an environment of 25° C., the battery was charged to 4.2 V at a charging rate of 0.1 C, and discharged to 3.0 V at a discharging rate of 0.1 C, to measure the initial capacity $C_0$. Further, the battery was charged to 4.2 V at a charging rate of 0.1 C in an environment of 25° C., stored at 60° C. for 7 days, and discharged to 3.0 V at a discharging rate of 0.1 C in an environment of 25° C., to measure the capacity $C_1$ after storage at high temperature. The high-temperature storage property was evaluated by a capacity keeping ratio $\Delta C_s$ represented by $\Delta C_s = C_1/C_0 \times 100$ (%). High value of the capacity keeping ratio $\Delta C_s$ is indicative of high high-temperature storage property.

3. High-Temperature Cycle Property

Each laminated cell lithium ion secondary battery produced in Examples and Comparative Examples was allowed to stand for 24 hours. Then, in an environment of 25° C., the battery was charged to 4.2 V at a charging rate of 0.1 C, and discharged to 3.0 V at a discharging rate of 0.1 C, to measure the initial capacity $C_o$. Further, in an environment of 60° C., a charging/discharging cycle wherein the battery was charged to 4.2 V at a charging rate of 0.1 C and then discharged to 3.0 V at a discharging rate of 0.1 C was repeated 100 times (100 cycles), and the capacity $C_2$ after 100 cycles was measured. The high-temperature cycle property was evaluated by a capacity keeping ratio $\Delta C_c$ represented by $\Delta C_c = C_2/C_0 \times 100$ (%). High value of the capacity keeping ratio $\Delta C_c$ is indicative of high high-temperature cycle property.

4. Electrode Plate Expansion Property

After the evaluation of "2. High-Temperature Storage Property", the cell of the lithium ion secondary battery was disassembled, and the thickness d1 of the electrode plate of the electrode was measured. The thickness of the electrode plate of the electrode before producing the lithium ion secondary battery cell was defined as d0. The electrode plate expansion ratio of the electrode ((d1−d0)/d0)×100 (%) was calculated. Low value of this ratio is indicative of good electrode plate expansion property.

5. Adhesion Strength after Measurement of High-Temperature Cycle Property

After the evaluation of "3. High-Temperature Cycle Property", the cell of the lithium ion secondary battery was disassembled, and the electrode was taken out, and dried at 60° C. for 24 hours under a reduced pressure of 0.1 MPa or less. Adhesion strength of the dried electrode was measured in the same manner as in "1. Adhesion Strength" except that the size of the test piece was 40 mm in length and 10 mm in width.

6. Low-Temperature Output Property

Each laminated cell lithium ion secondary battery produced in Examples and Comparative Examples was allowed to stand for 24 hours, and subjected to a charging operation at 0.1 C for 5 hours in an environment of 25° C. The voltage $V_0$ at this time was measured. Then the battery was subjected to a discharging operation at 0.1 C in an environment of −25° C. Voltage $V_{10}$ that is the value ten seconds after the onset of discharging was measured. The low-temperature output property was evaluated by voltage change $\Delta V$ represented by $\Delta V = V_0 - V_{10}$. Low value of the voltage variation $\Delta V$ is indicative of good low-temperature output property.

Example 1

1-1. Production of Water-Soluble Polymer

In a 5-MPa pressure-resistant container equipped with a stirrer, 10 parts of sodium styrenesulfonate as an aromatic vinyl monomer, 35 parts of methacrylic acid as an unsaturated carboxylic acid monomer, 0.8 parts of ethylene dimethacrylate as a crosslinkable monomer, 10 parts of 2,2,2-trifluoroethyl methacrylate as a fluorine-containing (meth) acrylic acid ester monomer, 44.2 parts of ethyl acrylate as an optional monomer, 150 parts of ion-exchanged water as a solvent, and 0.5 parts of potassium persulfate as a polymerization initiator were placed. The mixture was sufficiently stirred, and then heated at 60° C. to initiate polymerization. When the polymerization conversion ratio reached 96%, the mixture was cooled to cease the reaction, to thereby obtain a mixture containing a water-soluble polymer. To the mixture containing the water-soluble polymer, 10% ammonia water was added to adjust the pH to 8. Thus, a desired aqueous solution containing a water-soluble polymer was obtained.

1-2. Production of Binder Composition

In a 5-MPa pressure-resistant container equipped with a stirrer, 33 parts of 1,3-butadiene, 1.5 parts of methacrylic acid, 65.5 parts of styrene, 4 parts of sodium dodecylbenzenesulfonate as an emulsifier, 150 parts of ion-exchanged water, and 0.5 parts of potassium persulfate as a polymerization initiator were placed. The mixture was sufficiently stirred, and then heated to 50° C. to initiate polymerization. When the polymerization conversion ratio reached 96%, the mixture was cooled to cease the reaction, to thereby obtain a mixture containing particulate binder (styrene butadiene rubber). To the mixture containing particulate binder, a 5% sodium hydroxide aqueous solution was added to adjust the pH to 8. The unreacted monomer was removed by heat distillation under reduced pressure, and the residue was cooled to 30° C. or lower, to obtain a desired aqueous dispersion containing particulate binder.

The aqueous solution containing the water-soluble polymer obtained in the aforementioned (1-1. Production of Water-Soluble Polymer) was diluted with ion-exchanged water to adjust the concentration to 5%. The diluted aqueous solution was mixed with the obtained aqueous dispersion containing particulate binder so that the solid content ratio of (the water-soluble polymer):(the particulate binder)=10:2 (by weight), to thereby obtain a binder composition.

1-3. Production of Negative Electrode Slurry Composition

In a planetary mixer equipped with a disper, 90 parts of artificial graphite (volume average particle diameter: 24.5 μm) having a specific surface area of 4 m$^2$/g as a negative electrode active material, 10 parts of SiO$_x$ (available from Shin-Etsu Chemical Co., Ltd., volume average particle diameter: 5 μm), and 1 part of 1% aqueous solution of carboxymethyl cellulose ("BSH-12" available from DAI-ICHI KOGYO SEIYAKU CO., LTD.) in terms of solid content as a dispersing agent were placed. Then the solid content concentration thereof was adjusted to 55% with ion-exchanged water, and mixing was performed at 25° C. for 60 minutes. Subsequently, the solid content concentration was adjusted to 52% with ion-exchanged water, and mixing was further performed at 25° C. for 15 minutes to obtain a mixed liquid.

To the mixed liquid, the aqueous dispersion of binder composition obtained in the aforementioned (1-2. Production of Binder Composition) was added. The amount of the binder composition was 2 parts, in terms of amount of particulate binder, relative to 100 part total amount of the negative electrode active material. Further, ion-exchanged water was added thereto so as to adjust the final solid content concentration to 50%, and mixing was performed for 10 minutes. This mixture was defoamed under reduced pressure to obtain a negative electrode slurry composition having good fluidity.

1-4. Production of Negative Electrode

The negative electrode slurry composition obtained in the aforementioned (1-3. Production of Negative Electrode Slurry Composition) was applied onto copper foil having a thickness of 20 μm as a current collector using a comma coater so that the layer thickness after drying was about 150 μm. The slurry composition was then dried. The drying was performed by conveying the copper foil at a speed of 0.5 m/min in an oven at 60° C. over 2 minutes. Then heat-treatment at 120° C. for 2 minutes was performed, to obtain a raw material for a negative electrode. The raw material for a negative electrode was rolled with a roll press, to obtain a negative electrode having a negative electrode active material layer with a thickness of 80 μm.

The adhesion strength of the negative electrode thus obtained was measured.

1-5. Production of Positive Electrode

As a binder for a positive electrode, 40% aqueous dispersion of acrylate polymer having a glass transition temperature Tg of −40° C. and a number average particle diameter of 0.20 μm was prepared. The acrylate polymer was a copolymer obtained by emulsion polymerization of a monomer mixture containing 78% by weight of 2-ethylhexyl acrylate, 20% by weight of acrylonitrile, and 2% by weight of methacrylic acid.

100 parts of lithium cobaltate having a volume average particle diameter of 10 μm as a positive electrode active material, 1 part of 1% aqueous solution of carboxymethyl cellulose ("BSH-12" available from DAI-ICHI KOGYO SEIYAKU CO., LTD.) in terms of solid content as a dispersing agent, 5 parts of 40% aqueous dispersion of the acrylate polymer in terms of solid content as a binder, and ion-exchanged water were mixed. The amount of ion-exchanged water was adjusted so that the total solid content concentration was 40%. The mixture was mixed with a planetary mixer to prepare a positive electrode slurry composition.

The positive electrode slurry composition was applied onto copper foil having a thickness of 20 μm as a current collector using a comma coater so that the layer thickness after drying was about 200 μm. The slurry composition was then dried. The drying was performed by conveying the copper foil at a speed of 0.5 m/min in an oven at 60° C. over 2 minutes. The copper foil was heat-treated at 120° C. for 2 minutes to obtain a positive electrode.

1-6. Preparation of Separator

A single layer polypropylene separator (width: 65 mm, length: 500 mm, thickness: 25 μm, produced by a drying method, porosity: 55%) was cut into a square of 5 cm×5 cm.

1-7. Lithium Ion Secondary Battery

An exterior package made of an aluminum packing material was prepared as an exterior of a battery. The positive electrode obtained in the aforementioned (1-5. Production of Positive Electrode) was cut into a square of 4 cm×4 cm, which was then disposed so that the surface of the positive electrode on a current collector side was brought into contact with the exterior package made of an aluminum packing material. The square separator obtained in the aforementioned (1-6. Preparation of Separator) was disposed on the face of a positive electrode active material layer of the positive electrode. The negative electrode obtained in the aforementioned (1-4. Production of Negative Electrode) was cut into a square of 4.2 cm×4.2 cm, which was then disposed on the separator so that the surface on a negative electrode active material layer side was opposed to the separator. This was charged with a $LiPF_6$ solution having a concentration of 1.0 M (solvent was a mixed solvent of EC and DEC at ED/DEC=1/2 (by volume)) as an electrolytic solution. The aluminum exterior package was closed by heat sealing at 150° C. so as to seal the opening of the aluminum packing material. Thus, a lithium ion secondary battery was produced.

As to the lithium ion secondary battery thus obtained, high-temperature storage property, high-temperature cycle property, electrode plate expansion property, adhesion strength after measurement of high-temperature storage property, and low-temperature output property were evaluated.

Example 2

A lithium ion secondary battery was produced and evaluated in the same manner as in Example 1 except that a 40% aqueous dispersion of acrylate polymer that was the same as that used as the binder for a positive electrode in Example 1 was used as the aqueous dispersion containing a particulate binder in the aforementioned (1-2. Production of Binder Composition).

Example 3

A lithium ion secondary battery was produced and evaluated in the same manner as in Example 1 except that an aqueous dispersion containing a diene polymer having a glass transition temperature of −36° C. and a number average particle diameter of 0.15 μm was used as the aqueous dispersion containing a particulate binder in the aforementioned (1-2. Production of binder composition), wherein the diene polymer was a copolymer obtained by emulsion polymerization of a monomer mixture containing 18.5% by weight of acrylonitrile, 78.5% by weight of 1,3-butadiene, and 3% by weight of itaconic acid.

Example 4

A lithium ion secondary battery was produced and evaluated in the same manner as in Example 1 except that the amount of sodium styrenesulfonate as the aromatic vinyl monomer was changed to 2 parts and the amount of ethyl acrylate as the optional monomer was changed to 52.2 parts in the aforementioned (1-1. Production of Water-Soluble Polymer).

Example 5

A lithium ion secondary battery was produced and evaluated in the same manner as in Example 1 except that the amount of sodium styrenesulfonate as the aromatic vinyl monomer was changed to 27 parts and the amount of ethyl acrylate as the optional monomer was changed to 27.2 parts in the aforementioned (1-1. Production of Water-Soluble Polymer).

Example 6

A lithium ion secondary battery was produced and evaluated in the same manner as in Example 1 except that styrene was used in place of sodium styrenesulfonate as the aromatic vinyl monomer in the aforementioned (1-1. Production of Water-Soluble Polymer).

Example 7

A lithium ion secondary battery was produced and evaluated in the same manner as in Example 1 except that the amount of methacrylic acid as the unsaturated carboxylic acid monomer was changed to 22 parts and the amount of ethyl acrylate as the optional monomer was changed to 57.2 parts in the aforementioned (1-1. Production of Water-Soluble Polymer).

Example 8

A lithium ion secondary battery was produced and evaluated in the same manner as in Example 1 except that the amount of methacrylic acid as the unsaturated carboxylic acid monomer was changed to 58 parts and the amount of ethyl acrylate as the optional monomer was changed to 21.2 parts in the aforementioned (1-1. Production of Water-Soluble Polymer).

Example 9

A lithium ion secondary battery was produced and evaluated in the same manner as in Example 1 except that acrylic acid was used in place of methacrylic acid as the unsaturated carboxylic acid monomer in the aforementioned (1-1. Production of Water-Soluble Polymer).

Example 10

A lithium ion secondary battery was produced and evaluated in the same manner as in Example 1 except that allyl glycidyl ether was used in place of ethylene dimethacrylate as the crosslinkable monomer in the aforementioned (1-1. Production of Water-Soluble Polymer).

Example 11

A lithium ion secondary battery was produced and evaluated in the same manner as in Example 1 except that glycidyl methacrylate was used in place of ethylene dimethacrylate as the crosslinkable monomer in the aforementioned (1-1. Production of Water-Soluble Polymer).

Example 12

A lithium ion secondary battery was produced and evaluated in the same manner as in Example 1 except that the amount of ethylene dimethacrylate as the crosslinkable monomer was changed to 0.1 parts and the amount of ethyl acrylate as the optional monomer was changed to 44.9 parts in the aforementioned (1-1. Production of Water-Soluble Polymer).

Example 13

A lithium ion secondary battery was produced and evaluated in the same manner as in Example 1 except that the amount of ethylene dimethacrylate as the crosslinkable monomer was changed to 1.8 parts and the amount of ethyl acrylate as the optional monomer was changed to 43.2 parts in the aforementioned (1-1. Production of Water-Soluble Polymer).

Example 14

A lithium ion secondary battery was produced and evaluated in the same manner as in Example 1 except that 2,2,2-trifluoroethyl methacrylate was not used as the fluorine-containing (meth)acrylic acid ester monomer and the amount of ethyl acrylate as the optional monomer was changed to 54.2 parts in the aforementioned (1-1. Production of Water-Soluble Polymer).

Example 15

A lithium ion secondary battery was produced and evaluated in the same manner as in Example 1 except that the amount of 2,2,2-trifluoroethyl methacrylate as the fluorine-containing (meth)acrylic acid ester monomer was changed to 2 parts and the amount of ethyl acrylate as the optional monomer was changed to 52.2 parts in the aforementioned (1-1. Production of Water-Soluble Polymer).

Example 16

A lithium ion secondary battery was produced and evaluated in the same manner as in Example 1 except that the amount of 2,2,2-trifluoroethyl methacrylate as the fluorine-containing (meth)acrylic acid ester monomer was changed to 28 parts and the amount of ethyl acrylate as the optional monomer was changed to 26.2 parts in the aforementioned (1-1. Production of Water-Soluble Polymer).

Example 17

A lithium ion secondary battery was produced and evaluated in the same manner as in Example 1 except that the mixing ratio was changed to (water-soluble polymer):(particulate binder)=0.2:2 (by weight) in terms of solid content upon mixing the aqueous solution containing the water-soluble polymer and the aqueous dispersion containing the particulate binder in the aforementioned (1-2. Production of Binder Composition).

Example 18

A lithium ion secondary battery was produced and evaluated in the same manner as in Example 1 except that the mixing ratio was changed to (water-soluble polymer):(particulate binder)=28:2 (by weight) in terms of solid content upon mixing the aqueous solution containing the water-soluble polymer and the aqueous dispersion containing the particulate binder in the aforementioned (1-2. Production of Binder Composition).

Example 19

A lithium ion secondary battery was produced and evaluated in the same manner as in Example 1 except that 100 parts of artificial graphite having a specific surface area of 4 $m^2/g$ (average particle diameter: 24.5 μm) was used as the negative electrode active material and $SiO_x$ (average particle diameter: 5 μm) was not used in the aforementioned (1-3. Production of Negative Electrode Slurry Composition).

Example 20

A lithium ion secondary battery was produced and evaluated in the same manner as in Example 1 except that the amount of artificial graphite as the negative electrode active material was changed to 50 parts and the amount of $SiO_x$ was changed to 50 parts in the aforementioned (1-3. Production of Negative Electrode Slurry Composition).

Example 21

21-1. Production of Binder Composition

A binder composition was obtained in the same manner as in the aforementioned (1-2. Production of Binder Composition) in Example 1 except that the 40% aqueous dispersion of acrylate polymer that was the same as that used as the binder for a positive electrode in Example 1 was used as the aqueous dispersion containing the particulate binder.

21-2. Production of Positive Electrode Slurry Composition

A positive electrode slurry composition was obtained in the same manner as in the aforementioned (1-3. Production of Negative Electrode Slurry Composition) in Example 1 except that 100 parts of lithium cobaltate having a volume average particle diameter of 10 μm was used as the positive electrode active material in place of the negative electrode active material and the binder composition obtained in the aforementioned (21-1. Production of Binder Composition) was used in place of the binder composition obtained in the aforementioned (1-2. Production of Binder Composition).

21-3. Production of Positive Electrode

The positive electrode slurry composition obtained in the aforementioned (21-2. Production of Positive Electrode Slurry Composition) was applied onto copper foil having a thickness of 20 μm as a current collector using a comma coater so that the layer thickness after drying was about 120 μm. The slurry composition was then dried. The drying was performed by conveying the copper foil at a speed of 0.5 m/min in an oven at 60° C. over 2 minutes. Then heat-treatment at 120° C. for 2 minutes was performed, to obtain a raw material for a positive electrode. The raw material for a positive electrode was rolled with a roll press, to obtain a positive electrode having a positive electrode active material layer with a thickness of 75 µm.

The adhesion strength of the positive electrode thus obtained was measured.

21-4. Production of Negative Electrode

As a binder for a negative electrode, a 40% aqueous dispersion of acrylate polymer that was the same as that used as the binder for a positive electrode in Example 1 was prepared.

100 parts of a mixture obtained by mixing graphite having a volume average particle diameter of 15 µm as a negative electrode active material and $SiO_x$ having a volume average particle diameter of 5 µm at a weight ratio of 9:1, 1 part of 1% aqueous solution of carboxymethyl cellulose ("BSH-12" available from DAI-ICHI KOGYO SEIYAKU CO., LTD.) in terms of solid content as a dispersing agent, 5 parts of the aforementioned 40% aqueous dispersion of the acrylate polymer in terms of solid content as a binder, and ion-exchanged water were mixed. The amount of ion-exchanged water was adjusted so that the total solid content concentration was 40%. The mixture was mixed with a planetary mixer to prepare a negative electrode slurry composition.

The negative electrode slurry composition was applied onto copper foil having a thickness of 20 µm as a current collector using a comma coater so that the layer thickness after drying was about 100 µm. The slurry composition was then dried. The drying was performed by conveying the copper foil at a speed of 0.5 m/min in an oven at 60° C. over 2 minutes. Then heat-treatment at 120° C. for 2 minutes was performed, to obtain a negative electrode.

21-5. Lithium Ion Secondary Battery

An exterior package made of an aluminum packing material was prepared as an exterior of a battery. The negative electrode obtained in the aforementioned (21-4) was cut into a square of 4 cm×4 cm, which was then disposed so that the surface of the negative electrode on a current collector side was brought into contact with the exterior package made of an aluminum packing material. A square separator that was the same as in Example 1 was disposed on the face of a negative electrode active material layer of the negative electrode. The positive electrode obtained in the aforementioned (21-3) was cut into a square of 4.2 cm×4.2 cm, which was then disposed on the separator so that the surface on a positive electrode active material layer side was opposed to the separator. This was charged with a $LiPF_6$ solution having a concentration of 1.0 M (solvent was a mixed solvent of EC and DEC at ED/DEC=1/2 (by volume)) as an electrolytic solution. The aluminum exterior package was closed by heat sealing at 150° C. so as to seal the opening of the aluminum packing material. Thus, a lithium ion secondary battery was produced.

As to the lithium ion secondary battery thus obtained, high-temperature storage property, high-temperature cycle property, electrode plate expansion property, adhesion strength after measurement of high-temperature storage property, and low-temperature output property were evaluated.

Example 22

A lithium ion secondary battery was produced and evaluated in the same manner as in Example 21 except that lithium manganate having a volume average particle diameter of 15 µm was used as the positive electrode active material in the aforementioned (21-2. Production of Positive Electrode Slurry Composition).

Example 23

23-1. Production of Negative Electrode

The negative electrode slurry composition obtained in the aforementioned (1-3. Production of Negative Electrode Slurry Composition) in Example 1 was subjected to spray-drying granulation, to obtain spherical composite particles having a volume average particle diameter of 47 µm and a sphericity of 91%. The spray-drying granulation was performed using a spray drier (OC-16, manufactured by Ohkawara Kakohki Co., Ltd.) under conditions of a rotation speed of rotary disk system atomizer (diameter: 65 mm) of 25,000 rpm, a hot air temperature of 150° C., and a temperature at a particle collecting outlet port of 90° C.

The composite particles were supplied to rolls (roll temperature: 100° C., press linear pressure: 3.9 kN/cm) of a roll press machine (press-cutting rough surface heat roll; manufactured by HIRANO GIKEN KOGYO Co., Ltd.) together with copper foil having a thickness of 20 µm, to mold a sheet-shaped raw material for an electrode at a molding speed of 20 m/min. The raw material for an electrode was rolled by roll press to obtain a negative electrode for a secondary battery having a layer structure of (copper foil)/(negative electrode active material layer) with the thickness of the negative electrode active material layer being 80 µm.

The adhesion strength of the negative electrode thus obtained was measured.

23-2. Production and Evaluation of Secondary Battery, etc.

A lithium ion secondary battery was produced and evaluated in the same manner as in the aforementioned (1-5. Production of Positive Electrode)-(1-7. Lithium Ion Secondary Battery) in Example 1 except that the negative electrode obtained in the aforementioned (23-1. Production of Negative Electrode) was used as the negative electrode in place of the negative electrode obtained in the aforementioned (1-4. Production of Negative Electrode) in Example 1.

Example 24

24-1. Production of Positive Electrode

The positive electrode slurry composition obtained in the aforementioned (21-2. Production of Positive Electrode Slurry Composition) in Example 21 was subjected to spray-drying granulation, to obtain spherical composite particles having a volume average particle diameter of 53 µm and a sphericity of 94%. The spray-drying granulation was performed using a spray drier (OC-16, manufactured by Ohkawara Kakohki Co., Ltd.) under conditions of a rotation speed of rotary disk system atomizer (diameter: 65 mm) of 25,000 rpm, a hot air temperature of 150° C., and a temperature at the particle collecting outlet port of 90° C.

The composite particles were supplied to rolls (roll temperature: 100° C., press linear pressure: 3.9 kN/cm) of a roll press machine (press-cutting rough surface heat roll; manufactured by HIRANO GIKEN KOGYO Co., Ltd.) together with copper foil having a thickness of 20 µm, to mold a sheet-shaped raw material for an electrode at a molding speed of 20 m/min. The raw material for an electrode was rolled by roll press to obtain a positive electrode for a secondary battery having a layer structure of (copper foil)/(positive electrode active material layer) with the thickness of the positive electrode active material layer being 75 µm.

The adhesion strength of the positive electrode thus obtained was measured.

24-2. Production and Evaluation of Secondary Battery, etc.

A lithium ion secondary battery was produced and evaluated in the same manner as in the aforementioned (21-4. Production of Negative Electrode)-(21-5. Lithium Ion Secondary Battery) in Example 21 except that the positive electrode obtained in the aforementioned (24-1. Production of Positive Electrode) was used as the positive electrode in place of the positive electrode obtained in the aforementioned (21-3. Production of Positive Electrode) in Example 21.

Comparative Example 1

A lithium ion secondary battery was produced and evaluated in the same manner as in Example 1 except that the aqueous solution containing a water-soluble polymer was not added and the aqueous dispersion containing the particulate binder was used as it was as the binder composition in the aforementioned (1-2. Production of Binder Composition).

Comparative Example 2

A lithium ion secondary battery was produced and evaluated in the same manner as in Example 1 except that, in the aforementioned (1-2. Production of Binder Composition), sodium polyacrylate (weight average molecular weight: 250,000) was used in place of the water-soluble polymer obtained in the aforementioned (1-1. Production of Water-Soluble Polymer).

Comparative Example 3

A lithium ion secondary battery was produced and evaluated in the same manner as in Example 1 except that, in the aforementioned (1-1. Production of Water-Soluble Polymer), 50 parts of styrene was used in place of sodium styrenesulfonate as the aromatic vinyl monomer, 50 parts of maleic anhydride was used in place of methacrylic acid, and ethylene dimethacrylate, 2,2,2-trifluoroethyl methacrylate, and ethyl acrylate were not used.

Comparative Example 4

A lithium ion secondary battery was produced and evaluated in the same manner as in Example 1 except that, in the aforementioned (1-1. Production of Water-Soluble Polymer), 50 parts of styrene was used in place of sodium styrenesulfonate as the aromatic vinyl monomer, the amount of methacrylic acid as the unsaturated carboxylic acid monomer was changed to 10 parts, 40 parts of acrylonitrile was used in place of ethyl acrylate as the optional monomer, and ethylene dimethacrylate and 2,2,2-trifluoroethyl methacrylate were not used.

Comparative Example 5

A lithium ion secondary battery was produced and evaluated in the same manner as in Example 1 except that, in the aforementioned (1-1. Production of Water-Soluble Polymer), 10 parts of styrene was used in place of sodium styrenesulfonate as the aromatic vinyl monomer, the amount of methacrylic acid as the unsaturated carboxylic acid monomer was changed to 40 parts, 50 parts of acrylonitrile was used in place of ethyl acrylate as the optional monomer, and ethylene dimethacrylate and 2,2,2-trifluoroethyl methacrylate were not used.

Comparative Example 6

A lithium ion secondary battery was produced and evaluated in the same manner as in Example 1 except that, in the aforementioned (1-1. Production of Water-Soluble Polymer), 10 parts of styrene was used in place of sodium styrenesulfonate as an aromatic vinyl monomer, the amount of methacrylic acid as the unsaturated carboxylic acid monomer was changed to 40 parts, 10 parts of glycidyl methacrylate was used in place of ethylene dimethacrylate as the crosslinkable monomer, 40 parts of acrylonitrile was used in place of ethyl acrylate as the optional monomer, and 2,2,2-trifluoroethyl methacrylate was not used.

Comparative Example 7

A lithium ion secondary battery was produced and evaluated in the same manner as in Example 1 except that, in the aforementioned (1-1. Production of Water-Soluble Polymer), 10 parts of styrene was used in place of sodium styrenesulfonate as the aromatic vinyl monomer, the amount of methacrylic acid as the unsaturated carboxylic acid monomer was changed to 40 parts, 50 parts of acrylonitrile was used in place of ethyl acrylate as the optional monomer, and ethylene dimethacrylate and 2,2,2-trifluoroethyl methacrylate were not used; and that, in the aforementioned (1-3. Production of Negative Electrode Slurry Composition), 100 parts of artificial graphite having a specific surface area of 4 $m^2/g$ (average particle diameter: 24.5 μm) was used as the negative electrode active material, and $SiO_x$ (average particle diameter: 5 μm) was not used.

Comparative Example 8

A lithium ion secondary battery was produced and evaluated in the same manner as in Example 21 except that, in the aforementioned (21-1. Production of Binder Composition), the water-soluble polymer produced in Comparative Example 7 was used in place of the water-soluble polymer obtained in the aforementioned (1-1. Production of Water-soluble polymer) as the aqueous solution containing a water-soluble polymer.

Results

The results in Examples and Comparative Examples are shown in Tables 1 to 8. Abbreviations used in the following Tables correspond to the items as follows.

SBR: Styrene-butadiene rubber
ACR: Acrylic rubber
NBR: Acrylonitrile-butadiene rubber
NaSS: Sodium styrenesulfonate
ST: Styrene
MAA: Methacrylic acid
AA: Acrylic acid
EDMA: Ethylene dimethacrylate
AGE: Allyl glycidyl ether
GMA: Glycidyl methacrylate
3FM: 2,2,2-trifluoroethyl methacrylate
EA: Ethyl acrylate
AN: Acrylonitrile
LCO: Lithium cobaltate
LMO: lithium manganate

TABLE 1

[Results of Examples 1-4]

| | | Ex. 1 | Ex. 2 | Ex. 3 | Ex. 4 |
|---|---|---|---|---|---|
| Particulate binder | Type | SBR | ACR | NBR | SBR |
| Composition of water-soluble polymer | Aromatic vinyl monomer Type | NaSS | NaSS | NaSS | NaSS |
| | Aromatic vinyl monomer Amount (wt %) | 10 | 10 | 10 | 2 |
| | Unsaturated carboxylic acid monomer Type | MAA | MAA | MAA | MAA |
| | Unsaturated carboxylic acid monomer Amount (wt %) | 35 | 35 | 35 | 35 |
| | Crosslinkable monomer Type | EDMA | EDMA | EDMA | EDMA |
| | Crosslinkable monomer Amount (wt %) | 0.8 | 0.8 | 0.8 | 0.8 |
| | Fluorine-containing (meth)acrylic acid ester monomer Type | 3FM | 3FM | 3FM | 3FM |
| | Fluorine-containing (meth)acrylic acid ester monomer Amount (wt %) | 10 | 10 | 10 | 10 |
| | Optional copolymerizable monomer Type | EA | EA | EA | EA |
| | Optional copolymerizable monomer Amount (wt %) | 44.2 | 44.2 | 44.2 | 52.2 |
| Containing ratio of water-soluble polymer | Amount (parts) | 10 | 10 | 10 | 10 |
| Electrode active material | Negative electrode active material Amount of SiOx (parts) | 10 | 10 | 10 | 10 |
| | Negative electrode active material Amount of graphite (parts) | 90 | 90 | 90 | 90 |
| | Positive electrode active material Type | — | — | — | — |
| Particulate binder | Amount (parts) | 2 | 2 | 2 | 2 |
| Electrode production method | Coating method/powder molding | Coating method | Coating method | Coating method | Coating method |
| Adhesion strength | Peel strength of electrode (N/m) | 19.2 | 15.6 | 18.6 | 15.4 |
| Life properties | High-temperature storage property: capacity keeping ratio (%) | 93.8 | 91.3 | 90.5 | 91.5 |
| | High-temperature cycle property: capacity keeping ratio (%) | 91.1 | 89 | 87.6 | 89.5 |
| | Peel strength after high-temperature cycle property (N/m) | 16.3 | 12.2 | 15.7 | 13.3 |
| | Electrode plate expansion ratio (%) | 10.1 | 12.5 | 15.5 | 11.9 |
| Output property | Low-temperature output property: voltage reduction (mV) | 136 | 140 | 160 | 130 |

TABLE 2

[Results of Examples 5-8]

| | | Ex. 5 | Ex. 6 | Ex. 7 | Ex. 8 |
|---|---|---|---|---|---|
| Particulate binder | Type | SBR | SBR | SBR | SBR |
| Composition of water-soluble polymer | Aromatic vinyl monomer Type | NaSS | ST | NaSS | NaSS |
| | Aromatic vinyl monomer Amount (wt %) | 27 | 10 | 10 | 10 |
| | Unsaturated carboxylic acid monomer Type | MAA | MAA | MAA | MAA |
| | Unsaturated carboxylic acid monomer Amount (wt %) | 35 | 35 | 22 | 58 |
| | Crosslinkable monomer Type | EDMA | EDMA | EDMA | EDMA |
| | Crosslinkable monomer Amount (wt %) | 0.8 | 0.8 | 0.8 | 0.8 |
| | Fluorine-containing (meth)acrylic acid ester monomer Type | 3FM | 3FM | 3FM | 3FM |
| | Fluorine-containing (meth)acrylic acid ester monomer Amount (wt %) | 10 | 10 | 10 | 10 |
| | Optional copolymerizable monomer Type | EA | EA | EA | EA |
| | Optional copolymerizable monomer Amount (wt %) | 27.2 | 44.2 | 57.2 | 21.2 |
| Containing ratio of water soluble polymer | Amount (parts) | 10 | 10 | 10 | 10 |

TABLE 2-continued

[Results of Examples 5-8]

| | | | Ex. 5 | Ex. 6 | Ex. 7 | Ex. 8 |
|---|---|---|---|---|---|---|
| Electrode active material | Negative electrode active material | Amount of SiOx (parts) | 10 | 10 | 10 | 10 |
| | | Amount of graphite (parts) | 90 | 90 | 90 | 90 |
| | Positive electrode active material | Type | — | — | — | — |
| Particulate binder | | Amount (parts) | 2 | 2 | 2 | 2 |
| Electrode production method | | Coating method/ powder molding | Coating method | Coating method | Coating method | Coating method |
| Adhesion strength | Peel strength of electrode (N/m) | | 20.3 | 17.5 | 17.2 | 18.9 |
| Life properties | High-temperature storage property: capacity keepting ratio (%) | | 93.8 | 90.5 | 91.2 | 88.5 |
| | High-temperature cycle property: capacity keeping ratio (%) | | 92 | 88.5 | 90 | 85.5 |
| | Peel strength after high-temperature cycle property (N/m) | | 16.8 | 14.2 | 14.2 | 15.5 |
| | Electrode plate expansion ratio (%) | | 10.4 | 12.2 | 13.5 | 11.2 |
| Output property | Low-temperature output property: voltage reduction (mV) | | 145 | 148 | 154 | 130 |

TABLE 3

[Results of Examples 9-12]

| | | | Ex. 9 | Ex. 10 | Ex. 11 | Ex. 12 |
|---|---|---|---|---|---|---|
| Particulate binder | | Type | SBR | SBR | SBR | SBR |
| Composition of water-soluble polymer | Aromatic vinyl monomer | Type | NaSS | NaSS | NaSS | NaSS |
| | | Amount (wt %) | 10 | 10 | 10 | 10 |
| | Unsaturated carboxylic acid monomer | Type | AA | MAA | MAA | MAA |
| | | Amount (wt %) | 35 | 35 | 35 | 35 |
| | Crosslinkable monomer | Type | EDMA | AGE | GMA | EDMA |
| | | Amount (wt %) | 0.8 | 0.8 | 0.8 | 0.1 |
| | Fluorine-containing (meth)acrylic acid ester monomer | Type | 3FM | 3FM | 3FM | 3FM |
| | | Amount (wt %) | 10 | 10 | 10 | 10 |
| | Optional copolymerizable monomer | Type | EA | EA | EA | EA |
| | | Amount (wt %) | 44.2 | 44.2 | 44.2 | 44.9 |
| Containing ratio of water-soluble polymer | | Amount (parts) | 10 | 10 | 10 | 10 |
| Electrode active material | Negative electrode active material | Amount of SiOx (parts) | 10 | 10 | 10 | 10 |
| | | Amount of graphite (parts) | 90 | 90 | 90 | 90 |
| | Positive electrode active material | Type | — | — | — | — |
| Particulate binder | | Amount (parts) | 2 | 2 | 2 | 2 |
| Electrode production method | | Coating method/ powder molding | Coating method | Coating method | Coating method | Coating method |
| Adhesion strength | Peel strength of electrode (N/m) | | 17.8 | 17.7 | 18.2 | 16.8 |
| Life properties | High-temperature storage property: capacity keepting ratio (%) | | 92.5 | 92.5 | 92.1 | 91.1 |
| | High-temperature cycle property: capacity keeping ratio (%) | | 90.3 | 90.7 | 90.2 | 89.6 |
| | Peel strength after high-temperature cycle property (N/m) | | 15.8 | 14.6 | 16 | 14.4 |
| | Electrode plate expansion ratio (%) | | 11.8 | 10.8 | 12.8 | 12.2 |

TABLE 3-continued

[Results of Examples 9-12]

|  |  | Ex. 9 | Ex. 10 | Ex. 11 | Ex. 12 |
|---|---|---|---|---|---|
| Output property | Low-temperature output property: voltage reduction (mV) | 138 | 155 | 160 | 166 |

TABLE 4

[Results of Examples 13-16]

|  |  |  | Ex. 13 | Ex. 14 | Ex. 15 | Ex. 16 |
|---|---|---|---|---|---|---|
| Particulate binder |  | Type | SBR | SBR | SBR | SBR |
| Composition of water-soluble polymer | Aromatic vinyl monomer | Type | NaSS | NaSS | NaSS | NaSS |
|  |  | Amount (wt %) | 10 | 10 | 10 | 10 |
|  | Unsaturated carboxylic acid monomer | Type | MAA | MAA | MAA | MAA |
|  |  | Amount (wt %) | 35 | 35 | 35 | 35 |
|  | Crosslinkable monomer | Type | EDMA | EDMA | EDMA | EDMA |
|  |  | Amount (wt %) | 1.8 | 0.8 | 0.8 | 0.8 |
|  | Fluorine-containing (meth)acrylic acid ester monomer | Type | 3FM | — | 3FM | 3FM |
|  |  | Amount (wt %) | 10 | — | 2 | 28 |
|  | Optional copolymerizable monomer | Type | EA | EA | EA | EA |
|  |  | Amount (wt %) | 43.2 | 54.2 | 52.2 | 26.2 |
| Containing ratio of water-soluble polymer |  | Amount (parts) | 10 | 10 | 10 | 10 |
| Electrode active material | Negative electrode active material | Amount of SiOx (parts) | 10 | 10 | 10 | 10 |
|  |  | Amount of graphite (parts) | 90 | 90 | 90 | 90 |
|  | Positive electrode active material | Type | — | — | — | — |
| Particulate binder |  | Amount (parts) | 2 | 2 | 2 | 2 |
| Electrode production method |  | Coating method/powder molding | Coating method | Coating method | Coating method | Coating method |
| Adhesion strength | Peel strength of electrode (N/m) |  | 18.5 | 19.2 | 19.2 | 19.1 |
| Life properties | High-temperature storage property: capacity keepting ratio (%) |  | 93.5 | 91.5 | 92 | 93.5 |
|  | High-temperature cycle property: capacity keeping ratio (%) |  | 91.7 | 88.1 | 90.2 | 91.5 |
|  | Peel strength after high-temperature cycle property (N/m) |  | 16.5 | 12.6 | 14.4 | 16.1 |
|  | Electrode plate expansion ratio (%) |  | 10.8 | 12.5 | 11.3 | 10.8 |
| Output property | Low-temperature output property: voltage reduction (mV) |  | 130 | 155 | 135 | 110 |

TABLE 5

[Results of Examples 17-20]

|  |  |  | Ex. 17 | Ex. 18 | Ex. 19 | Ex. 20 |
|---|---|---|---|---|---|---|
| Particulate binder |  | Type | SBR | SBR | SBR | SBR |
| Composition of water-soluble polymer | Aromatic vinyl monomer | Type | NaSS | NaSS | NaSS | NaSS |
|  |  | Amount (wt %) | 10 | 10 | 10 | 10 |
|  | Unsaturated carboxylic acid monomer | Type | MAA | MAA | MAA | MAA |
|  |  | Amount (wt %) | 35 | 35 | 35 | 35 |
|  | Crosslinkable monomer | Type | EDMA | EDMA | EDMA | EDMA |
|  |  | Amount (wt %) | 0.8 | 0.8 | 0.8 | 0.8 |
|  | Fluorine-containing (meth)acrylic acid ester monomer | Type | 3FM | 3FM | 3FM | 3FM |
|  |  | Amount (wt %) | 10 | 10 | 10 | 10 |

TABLE 5-continued

[Results of Examples 17-20]

|  |  |  | Ex. 17 | Ex. 18 | Ex. 19 | Ex. 20 |
|---|---|---|---|---|---|---|
|  | Optional copolymerizable monomer | Type | EA | EA | EA | EA |
|  |  | Amount (wt %) | 44.2 | 44.2 | 44.2 | 44.2 |
| Containing ratio of water-soluble polymer |  | Amount (parts) | 0.2 | 28 | 10 | 10 |
| Electrode active material | Negative electrode active material | Amount of SiOx (parts) | 10 | 10 | 0 | 50 |
|  |  | Amount of graphite (parts) | 90 | 90 | 100 | 50 |
|  | Positive electrode active material | Type | — | — | — | — |
| Particulate binder |  | Amount (parts) | 2 | 2 | 2 | 2 |
| Electrode production method |  | Coating method/ powder molding | Coating method | Coating method | Coating method | Coating method |
| Adhesion strength | Peel strength of electrode (N/m) |  | 15.1 | 20.8 | 15.5 | 11.5 |
| Life properties | High-temperature storage property: capacity keepting ratio (%) |  | 91.8 | 91.5 | 94.4 | 90.1 |
|  | High-temperature cycle property: capacity keeping ratio (%) |  | 87.7 | 88 | 91.5 | 83.8 |
|  | Peel strength after high-temperature cycle property (N/m) |  | 12.2 | 17.5 | 13.2 | 8.2 |
|  | Electrode plate expansion ratio (%) |  | 12.1 | 9.8 | 7.5 | 12.6 |
| Output property | Low-temperature output property: voltage reduction (mV) |  | 145 | 165 | 110 | 165 |

TABLE 6

[Results of Examples 21-24]

|  |  |  | Ex. 21 | Ex. 22 | Ex. 23 | Ex. 24 |
|---|---|---|---|---|---|---|
| Particulate binder |  | Type | ACR | ACR | SBR | ACR |
| Composition of water-soluble polymer | Aromatic vinyl monomer | Type | NaSS | NaSS | NaSS | NaSS |
|  |  | Amount (wt %) | 10 | 10 | 10 | 10 |
|  | Unsaturated carboxylic acid monomer | Type | MAA | MAA | MAA | MAA |
|  |  | Amount (wt %) | 35 | 35 | 35 | 35 |
|  | Crosslinkable monomer | Type | EDMA | EDMA | EDMA | EDMA |
|  |  | Amount (wt %) | 0.8 | 0.8 | 0.8 | 0.8 |
|  | Fluorine-containing (meth)acrylic acid ester monomer | Type | 3FM | 3FM | 3FM | 3FM |
|  |  | Amount (wt %) | 10 | 10 | 10 | 10 |
|  | Optional copolymerizable monomer | Type | EA | EA | EA | EA |
|  |  | Amount (wt %) | 44.2 | 44.2 | 44.2 | 44.2 |
| Containing ratio of water soluble polymer |  | Amount (parts) | 10 | 10 | 10 | 10 |
| Electrode active material | Negative electrode active material | Amount of SiOx (parts) | — | — | 10 | — |
|  |  | Amount of graphite (parts) | — | — | 90 | — |
|  | Positive electrode active material | Type | LCO | LMO | — | LCO |
| Particulate binder |  | Amount (parts) | 2 | 2 | 2 | 2 |
| Electrode production method |  | Coating method/ powder molding | Coating method | Coating method | Powder molding | Powder molding |
| Adhesion strength | Peel strength of electrode (N/m) |  | 19.5 | 21.4 | 21.5 | 24.4 |
| Life properties | High-temperature storage property: capacity keepting ratio (%) |  | 90.2 | 91.4 | 93.5 | 92.3 |
|  | High-temperature cycle property: capacity keeping ratio (%) |  | 85.5 | 87.3 | 91.9 | 91.5 |

TABLE 6-continued

[Results of Examples 21-24]

|  |  | Ex. 21 | Ex. 22 | Ex. 23 | Ex. 24 |
|---|---|---|---|---|---|
|  | Peel strength after high-temperature cycle property (N/m) | 15.5 | 17.7 | 17.1 | 18.8 |
|  | Electrode plate expansion ratio (%) | 5.2 | 4.1 | 8.1 | 2.2 |
| Output property | Low-temperature output property: voltage reduction (mV) | 125 | 110 | 110 | 85 |

TABLE 7

[Results of Comparative Examples 1-4]

|  |  |  | Comp. Ex. 1 | Comp. Ex. 2 | Comp. Ex. 3 | Comp. Ex. 4 |
|---|---|---|---|---|---|---|
| Particulate binder |  | Type | SBR | SBR | SBR | SBR |
| Composition of water-soluble polymer | Aromatic vinyl monomer | Type | — | — | ST | ST |
|  |  | Amount (wt %) | — | — | 50 | 50 |
|  | Unsaturated carboxylic acid monomer | Type | — | — | Maleic anhydride | MAA |
|  |  | Amount (wt %) | — | — | 50 | 10 |
|  | Crosslinkable monomer | Type | — | — | — | — |
|  |  | Amount (wt %) | — | — | — | — |
|  | Fluorine-containing (meth)acrylic acid ester monomer | Type | — | — | — | — |
|  |  | Amount (wt %) | — | — | — | — |
|  | Optional copolymerizable monomer | Type | — | — | — | AN |
|  |  | Amount (wt %) | — | — | — | 40 |
| Containing ratio of water-soluble polymer |  | Amount (parts) | 0 | 10 | 10 | 10 |
| Electrode active material | Negative electrode active material | Amount of SiOx (parts) | 10 | 10 | 10 | 10 |
|  |  | Amount of graphite (parts) | 90 | 90 | 90 | 90 |
|  | Positive electrode active material | Type | — | — | — | — |
| Particulate binder |  | Amount (parts) | 2 | 2 | 2 | 2 |
| Electrode production method |  | Coating method/powder molding | Coating method | Coating method | Coating method | Coating method |
| Adhesion strength | Peel strength of electrode (N/m) |  | 12.2 | 12.7 | 12.8 | 10.4 |
| Life properties | High-temperature storage property: capacity keepting ratio (%) |  | 78.5 | 79.1 | 81.5 | 75.2 |
|  | High-temperature cycle property: capacity keeping ratio (%) |  | 75.1 | 76 | 78.8 | 71.3 |
|  | Peel strength after high-temperature cycle property (N/m) |  | 7.1 | 6.5 | 6.7 | 6.4 |
|  | Electrode plate expansion ratio (%) |  | 18.5 | 17.5 | 19.5 | 22.8 |
| Output property | Low-temperature output property: voltage reduction (mV) |  | 245 | 255 | 220 | 285 |

TABLE 8

[Results of Comparative Examples 5-8]

|  |  |  | Comp. Ex. 5 | Comp. Ex. 6 | Comp. Ex. 7 | Comp. Ex. 8 |
|---|---|---|---|---|---|---|
| Particulate binder |  | Type | SBR | SBR | SBR | ACR |
| Composition of water-soluble polymer | Aromatic vinyl monomer | Type | ST | ST | ST | ST |
|  |  | Amount (wt %) | 10 | 10 | 10 | 10 |
|  | Unsaturated carboxylic acid monomer | Type | MAA | MAA | MAA | MAA |
|  |  | Amount (wt %) | 40 | 40 | 40 | 40 |

TABLE 8-continued

[Results of Comparative Examples 5-8]

|  |  |  | Comp. Ex. 5 | Comp. Ex. 6 | Comp. Ex. 7 | Comp. Ex. 8 |
|---|---|---|---|---|---|---|
|  | Crosslinkable monomer | Type | — | GMA | — | — |
|  |  | Amount (wt %) | — | 10 | — | — |
|  | Fluorine-containing (meth)acrylic acid ester monomer | Type | — | — | — | — |
|  |  | Amount (wt %) | — | — | — | — |
|  | Optional copolymerizable monomer | Type | AN | AN | AN | AN |
|  |  | Amount (wt %) | 50 | 40 | 50 | 50 |
| Containing ratio of water soluble polymer |  | Amount (parts) | 10 | 10 | 10 | 10 |
| Electrode active material | Negative electrode active material | Amount of SiOx (parts) | 10 | 10 | 0 | — |
|  |  | Amount of graphite (parts) | 90 | 90 | 100 | — |
|  | Positive electrode active material | Type | — | — | — | LCO |
| Particulate binder |  | Amount (parts) | 2 | 2 | 2 | 2 |
| Electrode production method |  | Coating method/ powder molding | Coating method | Coating method | Coating method | Coating method |
| Adhesion strength | Peel strength of electrode (N/m) |  | 8.8 | 7.4 | 10.5 | 15.5 |
| Life properties | High-temperature storage property: capacity keepting ratio (%) |  | 71.8 | 70.1 | 82.6 | 80.3 |
|  | High-temperature cycle property: capacity keeping ratio (%) |  | 62.6 | 60.3 | 78.8 | 79 |
|  | Peel strength after high-temperature cycle property (N/m) |  | 3.9 | 2.5 | 8.2 | 8.8 |
|  | Electrode plate expansion ratio (%) |  | 24.5 | 21.6 | 12.5 | 8.5 |
| Output property | Low-temperature output property: voltage reduction (mV) |  | 220 | 225 | 220 | 210 |

Discussion

As seen from comparison of Examples with Comparative Examples, the peel strength in Examples is higher than that in Comparative Examples, and the high-temperature storage property and the high-temperature cycle property in Examples are better than those in Comparative Examples. In both Examples 1 to 20 and 23 regarding the negative electrode and Examples 21, 22, and 24 regarding the positive electrode, good results are obtained. From this fact, it is found out that the aforementioned effects are obtained in both the positive electrode and the negative electrode. In both Examples 1 to 22 regarding the coating method and Examples 23 and 24 regarding the powder molding method, good results are obtained. From this fact, it is found out that the aforementioned effects are obtained in both the coating method and the powder molding method.

The peel strength in Example 20 is inferior to those in other Examples. This is considered to be due to use of the negative electrode active material in Example 20 which has, unlike those in other Examples, high degrees of expansion and shrinkage. In consideration of use of the negative electrode active material having high degrees of expansion and shrinkage, the peel strength obtained in Example 20 should be evaluated as sufficiently strong. Therefore, this should be evaluated as showing the effect of the present invention.

The invention claimed is:

1. An electrode for a lithium ion secondary battery, comprising an electrode active material and a water-soluble polymer, wherein
the water-soluble polymer is a copolymer containing 1% by weight to 30% by weight of an aromatic vinyl monomer unit, 20% by weight to 60% by weight of an unsaturated carboxylic acid monomer unit, and 0.1% by weight to 5% by weight of a crosslinkable monomer unit,
wherein the aromatic vinyl monomer is a sodium styrenesulfate monomer.

2. The electrode for a lithium ion secondary battery according to claim 1, wherein the unsaturated carboxylic acid monomer unit is an unsaturated monocarboxylic acid monomer unit.

3. The electrode for a lithium ion secondary battery according to claim 1, wherein
the water-soluble polymer further contains a fluorine-containing (meth)acrylic acid ester monomer unit, and
a ratio of the fluorine-containing (meth)acrylic acid ester monomer unit is 1% by weight to 30% by weight.

4. The electrode for a lithium ion secondary battery according to claim 1, wherein a content of the water-soluble polymer is 0.1 parts by weight to 30 parts by weight relative to 100 parts by weight of the electrode active material.

5. The electrode for a lithium ion secondary battery according to claim 1, further comprising a particulate binder.

6. The electrode for a lithium ion secondary battery according to claim 1, wherein the copolymer contains 35% by weight to 60% by weight of the unsaturated carboxylic acid monomer unit.

7. A lithium ion secondary battery comprising a positive electrode, a negative electrode, an electrolytic solution, and a separator, wherein at least one of the positive electrode and the negative electrode is the electrode for a lithium ion secondary battery according to claim 1.

8. A slurry composition for producing an electrode for a lithium ion secondary battery, comprising an electrode active material and a water-soluble polymer, wherein the water-soluble polymer is a copolymer containing 1% by weight to 30% by weight of an aromatic vinyl monomer unit, 22% by weight to 60% by weight of an unsaturated carboxylic acid monomer unit, and 0.1% by weight to 5% by weight of a crosslinkable monomer unit, wherein the aromatic vinyl monomer is a sodium styrenesulfate monomer.

9. A method for producing an electrode for a lithium ion secondary battery, comprising applying the slurry composition according to claim 8 onto a current collector, and drying the slurry composition.

* * * * *